(12) United States Patent
Yamada et al.

(10) Patent No.: US 7,703,929 B2
(45) Date of Patent: Apr. 27, 2010

(54) EDGE BLENDING DEVICE, LIGHT SHIELDING DEVICE AND MULTI-PROJECTION SYSTEM

(75) Inventors: Norihiko Yamada, Suwa (JP); Hiroshi Hasegawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 733 days.

(21) Appl. No.: 11/562,846

(22) Filed: Nov. 22, 2006

(65) Prior Publication Data
US 2007/0139627 A1 Jun. 21, 2007

(30) Foreign Application Priority Data
Nov. 30, 2005 (JP) ............... 2005-345302
Nov. 1, 2006 (JP) ............... 2006-297446

(51) Int. Cl.
*G03B 21/26* (2006.01)
*G03B 21/14* (2006.01)
(52) U.S. Cl. ............... 353/94; 353/30; 353/97
(58) Field of Classification Search ........... 353/94, 353/30, 97
See application file for complete search history.

(56) References Cited

U.S. PATENT DOCUMENTS

| | | | | |
|---|---|---|---|---|
| 4,627,696 A | * | 12/1986 | Sacher | .................. 353/110 |
| 5,113,332 A | * | 5/1992 | Richardson | .................. 362/282 |
| 6,267,478 B1 | * | 7/2001 | Chen | .................. 353/84 |
| 6,513,938 B2 | * | 2/2003 | Kubota et al. | .................. 353/94 |
| 6,637,887 B2 | * | 10/2003 | Yamanaka | .................. 353/30 |

FOREIGN PATENT DOCUMENTS

JP  A 2001-268476  9/2001

* cited by examiner

*Primary Examiner*—Georgia Y Epps
*Assistant Examiner*—Magda Cruz
(74) *Attorney, Agent, or Firm*—Oliff & Berridge, PLC

(57) ABSTRACT

An edge blending device which suppresses an increase in a luminance of a projection screen in an overlap area in which projection lights projected from a plurality of projection units onto a screen overlap each other, is characterized by including: a light shielding unit holder which includes light shielding pattern formation portions which can form a light shielding pattern corresponding to the projection lights forming the overlap area; and a light shielding pattern drive controller which controls a drive of the light shielding unit holder in such a way that the light shielding pattern formation portions are positioned corresponding to the projection lights from the projection units.

14 Claims, 18 Drawing Sheets

USE CENTRAL FIVE COLUMNS (DISPLAY MODE M1)

USE ALL SEVEN COLUMNS (DISPLAY MODE M3)

USE CENTRAL THREE COLUMNS (DISPLAY MODE M0)

USE THREE COLUMNS ON EACH OF LEFT AND RIGHT EXCEPTING CENTER (DISPLAY MODE M2)

WHEN USING CENTRAL THREE COLUMNS (DISPLAY MODE M0)

WHEN USING CENTRAL FIVE COLUMNS (DISPLAY MODE M1)

WHEN USING THREE COLUMNS ON EACH OF LEFT AND RIGHT EXCEPTING CENTER (DISPLAY MODE M2)

WHEN USING ALL SEVEN COLUMNS (DISPLAY MODE M3)

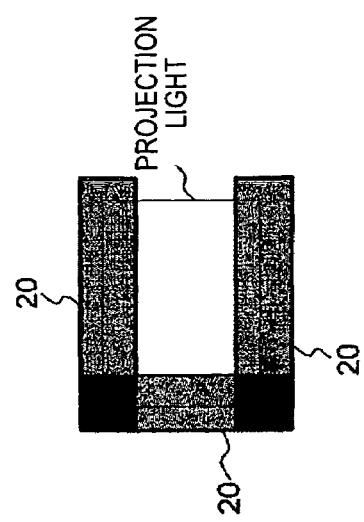
FIG. 11A
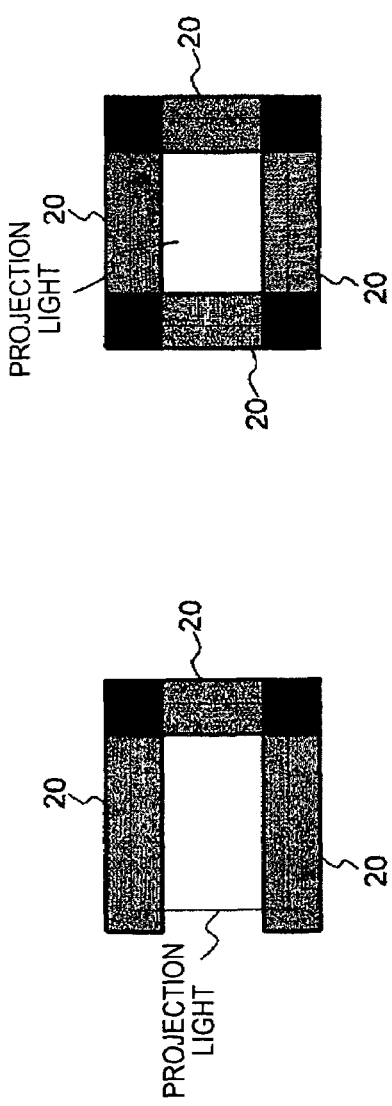
FIG. 11B
FIG. 11C
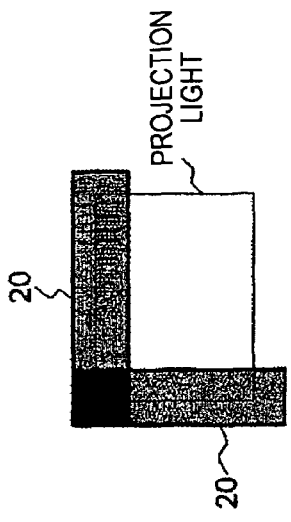
FIG. 11D
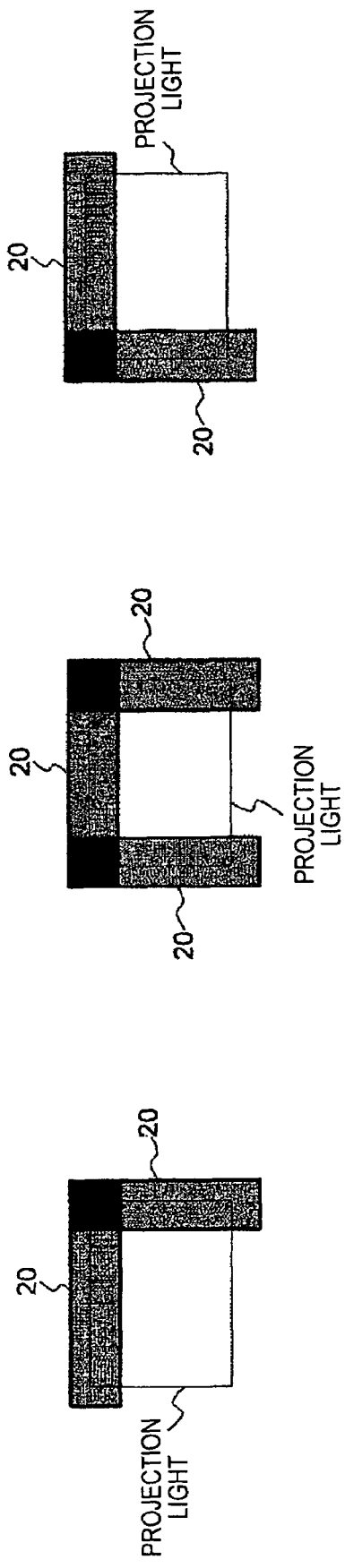
FIG. 11E
FIG. 11F

EDGE BLENDING DEVICE, LIGHT SHIELDING DEVICE AND MULTI-PROJECTION SYSTEM

BACKGROUND OF THE INVENTION

1. Technical Field to which the Invention Belongs

The present invention relates to an edge blending device for suppressing an increase in a luminance of an overlap area in which projection lights overlap each other, a light shielding device which shields the projection lights, and a multi-projection system which includes a plurality of projection units.

2. Description of the Related Art

In a multi-projection system in which is arranged a plurality of projectors serving as projection units, in a case in which an overlap area in which projection lights from adjacent projectors overlap each other is formed, in order to prevent a luminance of the overlap area from increasing compared with other areas, for example, it is necessary to apply some edge blending process, such as a level adjustment of an image signal corresponding to the overlap area of the projection lights projected by the individual projectors, a use of optical shielding unit, or a combination of both. By applying the edge blending process, it is possible to realize a high quality, large screen image in which no seam is noticed between adjacent projection lights.

An edge blending technology which adjusts an image signal level of the overlap area (referred to as a signal processing type edge blending technology) can be realized by using a dedicated image processing device manufactured for that purpose. However, this kind of dedicated image processing device is very expensive on account of being special-purpose dedicated hardware.

Also, although the signal processing type edge blending technology is rich in flexibility such as an easy setting in units of one pixel and an easy changing of a gradation level, there is also a problem in that a so-called "black floating" cannot be solved only by adjusting the image signal level.

Meanwhile, in an edge blending technology using the optical light shielding unit including a light shielding plate and a dark filter (referred to as an optical type edge blending technology), there is basically no need to process and treat the image signal itself and, as well as it being possible to suppress the "black floating", there is an advantage of being inexpensive.

FIGS. 15A and 15B schematically illustrate an example in which light shielding plates are used as the optical type edge blending technology. As shown in FIG. 15A, light shielding plates 20 corresponding to side edges of projection lights G1 and G2 from two projectors PJ11 and PJ12 are installed in respective defocusing areas and, as shown in FIG. 15B, a projection is carried out in such a way as to form an overlap area in the side edges of the individual projection lights.

FIGS. 16A and 16B show respectively a luminance level in the overlap area in a case of providing no light shielding plate, and a luminance level in the overlap area in a case of providing the light shielding plates. As can be seen from FIGS. 16A and 16B too, in the case of providing no light shielding plate 20, the luminance level increases in the overlap area (FIG. 16A) while, in the case of providing the light shielding plates 20, it is possible to suppress an increase in the luminance level in the overlap area (FIG. 16B). At this time, a black floating due to a leaked light caused by an optical modulator being unable to shield light can also be suppressed, as the leaked light can be shielded.

In this way, the optical type edge blending technology, as well as being able to solve the problem of the "black floating", has a feature of being inexpensive. Meanwhile, however, there is also a need to move light shielding unit such as the light shielding plates for the purpose of changing a form of usage as the multi-projection system or adjusting (whether manually or automatically) projection lights from projectors configuring the multi-projection system. As the movement of the light shielding unit, for example, a movement of the projection lights in an inward direction or an outward direction, a position adjustment within the projection lights, and the like can be considered.

As used herein, the "changing of the form of usage as the multi-projection system" refers to a changing of a combination of projectors, among the plurality of projectors configuring the multi-projection system, which carry out a projection, it being supposed that a display mode on a screen is switched. A specific example of the switching of the display mode will be described hereafter.

When this kind of display mode switching is carried out, as a pattern of an overlap area occurring between the projection lights from the individual projectors which carry out the projector also changes in many cases, a light shielding pattern corresponding to the pattern of the overlap area at that time is formed. For this reason, it is necessary to carry out an adjustment of the light shielding unit, such as a movement of the light shielding unit, for each projector.

At this time, in the event that there is a small number of projectors configuring the multi-projection system, it is not so difficult to manually carry out the adjustment of the light shielding unit but, in the event that there is a large number of projectors, or the projectors are installed in a high position or the like which is difficult to reach, a manual adjustment of all the light shielding unit is a very time-consuming operation, and there is also a problem in that it is impossible to quickly switch the display mode.

In order to respond to these kinds of problem, a technology enabling the light shielding unit to be automatically adjusted has also been proposed (for example, JP-A-2001-268476). In the technology disclosed in JP-A-2001-268476, one certain projector is provided with position control unit capable of an independent position control of four light shielding plates corresponding to four side edges of projection lights from the projector, enabling the position control of the four light shielding plates in a left and right direction or an up and down direction.

According to the JP-A-2001-268476, it is possible to obtain an advantage that a position control of each light shielding plate for changing a light shielding pattern along with the change in the pattern of the overlap area becomes possible, and that it is also possible to fine adjust the position control, and it is considered possible, by using a luminance sensor, to automatically adjust an area to be light shielded.

Also, in a case in which the plurality of projectors is used as the heretofore described "multi-projection system", a light source of a projector, among the plurality of projectors, which carries out no projection is normally stopped from emitting light, that is, turned off, causing the projection not to be carried out.

In the technology disclosed in JP-A-2001-268476, the position control unit for carrying out the position control of the light shielding plates for responding to the changing of the light shielding pattern or the like need to be provided, one corresponding to each light shielding plate. As the light shielding plate position control unit, a translation mechanism and its drive unit for enabling the individual light shielding plates to move in the left and right direction or the up and down direction are necessary and, as it also enables the individual light shielding plates to be moved in a range of a prescribed angle, a rotation mechanism and its drive unit for rotating the individual light shielding plates become necessary.

Consequently, in the case in which there is a large number of projectors configuring the multi-projection system, as a large number of light shielding plates is also required as a matter of course, as a light shielding pattern switching mechanism for changing the light shielding pattern, the translation mechanism for moving the large number of light shielding plates in the left and right or up and down direction, the rotation mechanism for rotating the large number of light shielding plates, and their drive unit become necessary, meaning that there is a problem in that, as well as a whole mechanism for carrying out an edge blending becoming very complicated, its control also becomes very complicated.

Also, when using the projectors as the multi-projection system, the projector which carries out no projection is caused not to carry out the projection by the light source being turned off. Consequently, in the projectors configuring the multi-projection system, each time the projection is carried out or not carried out depending on the display mode, the turning off and turning on of the light source are carried out. Incidentally, as an electrode of a lamp (for example, a high pressure mercury-vapor lamp) used for the light source of the projector wears out due to a discharge or the like at the time of the turning on, in some cases, a life of the lamp depends on a number of times it is turned on. Consequently, in a case in which the display mode changes frequently, as the number of times the lamp of the projector is turned on increases, there is a problem in that the lamp life is shortened. Also, a luminance of the lamp is low when it is turned on, and at least requires a time to reach a luminance which is normally used. Consequently, in a case in which the display mode is switched within a short time, there is a problem in that, as well as a brightness not being secured, a luminance difference becomes large in comparison with a projector which is continuously on.

SUMMARY OF THE INVENTION

Consequently, the invention, as well as having an object of providing an edge blending device which can easily carry out a switching of a light shielding pattern corresponding to a change in a pattern of an overlap area, has another object of providing a multi-projection system which, by using the edge blending device, can quickly set a light shielding pattern corresponding to a pattern of an overlap area formed between adjacent projection lights.

Furthermore, the invention has still another object of, as well as providing a light shielding device for responding to various display modes, particularly, without shortening a life of a lamp of a projector used in the multi-projection system, providing a multi-projection system in which, by using the light shielding device, a luminance difference is suppressed in the various display modes.

(1) In order to achieve the heretofore described objects, the invention is an edge blending device which suppresses an increase in a luminance of a projection screen in an overlap area in which projection lights projected from a plurality of projection units onto a screen overlap each other, characterized by including: a light shielding unit holder which includes light shielding pattern formation portions which can form a light shielding pattern corresponding to the projection lights forming the overlap area; and a light shielding pattern drive controller which controls a drive of the light shielding unit holder in such a way that the light shielding pattern formation portions are positioned corresponding to the projection lights from the projection units.

By having this kind of configuration, a light shielding pattern switching in response to a change of an overlap area pattern can be realized by a simple mechanism and a simple control. That is, as it is sufficient that the edge blending device of the invention, in the case in which the overlap area pattern changes, carries out an operation which simply drives the light shielding unit holder in such a way that the light shielding pattern formation portions which can form a light shielding pattern corresponding to the overlap area pattern is caused to face the projection lens of the projector, it is possible to make a light shielding pattern switching operation very simple. By this means, it is possible to easily set a light shielding pattern in response to the change in the overlap area pattern.

Consequently, by using this kind of edge blending device in the multi-projection system, even though a change occurs in an overlap area pattern formed between adjacent projection lights due to a changing of a form of usage of the multi-projection system or the like, it is possible to quickly set a light shielding pattern in response to the change.

Also, in the edge blending device, as no processing needs to be applied to a projector side, and a general-purpose projector can be used as it is, it is possible to flexibly respond to an increase or a reduction in a number of projectors configuring the multi-projection system, or a replacement of the projector.

Also, the edge blending device having this kind of configuration, as it is of a simple structure, can be inexpensively manufactured. Consequently, in a case of a large number of projectors configuring the multi-projection system, it is possible to significantly reduce a cost of a whole of the multi-projection system.

(2) In the edge blending device according to the heretofore described (1), it is preferable that the device further includes initial position detection unit for detecting an initial position of the light shielding unit holder, and that the light shielding pattern drive controller, with the initial position detected by the initial position detection unit as a reference, controls the drive of the light shielding unit holder.

In this way, by detecting the initial position of the light shielding unit holder, and controlling the drive of the light shielding unit holder with the detected initial position as a reference, for example, in a case of switching all the light shielding patterns of edge blending devices corresponding to the plurality of projectors at once due to the changing of the form of use of the multi-projection system or the like, it is possible to accurately carry out the light shielding pattern switching operation of each edge blending device.

(3) In the edge blending device according to the heretofore described (1) or (2), it is preferable that the light shielding unit holder is equipped with a board-like member including at least one opening formed in a board surface as a light shielding pattern formation portion, and that the board-like member is configured in such a way as to be movable by means of the light shielding pattern drive controller.

By causing the light shielding unit holder to have this kind of configuration, it is possible to easily form the opening serving as the light shielding pattern formation portion, by, for example, making a hole in the board-like member, that is, a flat plate by means of a pressing or the like. Also, by configuring this kind of board-like member in such a way that it is movable, it is possible to move a light shielding pattern formation portion corresponding to the overlap area pattern in such a way as to face the projection lens of the projector.

(4) In the edge blending device according to the heretofore described (3), it is preferable that the light shielding unit holder, being formed of a disk-like member having one rotation center, is provided with the light shielding pattern formation portions by forming a plurality of openings, which can transmit the projection lights from the projection units, at an equal distance from the rotation center and at prescribed intervals.

By causing the light shielding unit holder to have this kind of configuration, it is possible to make the structure of the edge blending device simple. Also, as the light shielding pattern formation portions are each provided by forming a circular or rectangular opening in the light shielding unit holder, the light shielding unit holder does not require special components as the light shielding pattern formation portions. Also, as each of the plurality of light shielding pattern formation portions can be caused to face the projection lens of the projector simply by rotating the light shielding unit holder formed of the disk-like member through every prescribed angle, it is possible to efficiently and reliably switch the light shielding pattern.

(5) In the edge blending device according to the heretofore described (1) to (4), it is preferable that the light shielding pattern is formed by attaching a light shielding plate to the light shielding pattern formation portions.

In this way, as a configuration is such that a desired light shielding pattern is formed by attaching the light shielding plate to the light shielding pattern formation portions, it is possible to form various light shielding patterns, and it is also possible to flexibly respond to the change in the overlap area pattern.

(6) A multi-projection system of the invention is characterized by including: a plurality of projection units; and an edge blending device which suppresses an increase in a luminance of a projection screen in an overlap area in which projection lights projected from the projection units onto a screen overlap each other, wherein the edge blending device includes: a light shielding unit holder which includes light shielding pattern formation portions which can form a light shielding pattern corresponding to the projection lights forming the overlap area; and a light shielding pattern drive controller which controls a drive of the light shielding unit holder in such a way that the light shielding pattern formation portions are positioned corresponding to the projection lights from the projection units.

In this way, the multi-projection system of the invention, acting as an edge blending device for suppressing an increase in a luminance of the overlap area, has the same functional configuration as that of the edge blending device according to the heretofore described (1), and it is possible to obtain the same advantage as that described in the edge blending device according to the heretofore described (1).

In the multi-projection system of the invention too, it is preferable that the edge blending device used in the multi-projection system has the functional configuration of the edge blending device according to the heretofore described (2) to (4). By this means, it is possible to obtain the same advantage as that described in the edge blending device according to (2) to (4).

(7) In the multi-projection system according to the heretofore described (6), it is preferable that the edge blending device is provided corresponding to each of the plurality of projection units.

In this way, by providing the edge blending device for each projector serving as the projection unit, it is sufficient that a light shielding pattern switching in response to the change in the overlap area pattern is carried out for each edge blending device corresponding to each projector. By this means, it is possible to make a light shielding pattern switching control simple, and it is possible to flexibly respond to the increase or reduction in the number of projectors configuring the multi-projection system, or the replacement of the projector.

(8) In the multi-projection system according to either of the heretofore described (6) or (7), the system is characterized in that the edge blending device, based on a display mode showing a combination of projectors, among the plurality of projectors, which are to carry out a projection, controls the drive of the light shielding unit holder.

In this way, although the pattern of the overlap area formed by the projection lights from the projectors which carry out the projection may change each time the display mode switches, according to the multi-projection system of the invention, even though the change in the overlap area pattern occurs due to the switching of the display mode, it is possible, by controlling the drive of the light shielding unit holder, to quickly set a light shielding pattern in response to the change in the overlap area pattern.

(9) In the multi-projection system according to the heretofore described (8), it is preferable that the light shielding pattern formed in the light shielding pattern formation portions is a light shielding pattern corresponding to the overlap area in which the projection lights overlap each other in the display mode.

In this way, a configuration is such that, in each of a plurality of kinds of display mode, a light shielding pattern corresponding to the overlap area in which the projection lights from the projectors serving as the projection units overlap each other is formed in the light shielding pattern formation portion. For this reason, by controlling the drive of the light shielding unit holder in response to the switching of the display mode, it is possible to cause a light shielding pattern formation portion, in which is formed a light shielding pattern corresponding to the display mode at that time, to face the projection lens of the projector. Consequently, even though the change in the overlap area pattern occurs due to the switching of the display mode, it is possible to quickly set a light shielding pattern in response to the change in the overlap area pattern.

(10) In the multi-projection system according to the heretofore described (8) or (9), it is preferable that the system further includes: a control terminal which enables a control of the edge blending device, wherein the control terminal, when a setting of the display mode is carried out, transmits a control signal instructing the setting of the display mode to the edge blending device.

By this means, it is possible to control each edge blending device from a remote location and, also in a multi-projection system having a large number of projectors, it is possible to control all of a large number of edge blending devices at once from the remote location.

(11) In the multi-blending system according to the heretofore described (10), it is preferable that the light shielding pattern drive controller of the edge blending device, based on the control signal, drives the light shielding unit holder in such a way that a light shielding pattern formation portion having the light shielding pattern corresponding to the overlap area formed in the display mode is positioned corresponding to a projection light from a projection unit corresponding to the edge blending device.

By this means, it is possible, in response to the switching of the display mode, to carry out a switching control of the light shielding pattern formation portions of edge blending devices corresponding to the plurality of projectors.

(12) In the multi-projection system according to either of the heretofore described (10) or (11), it is preferable that the control terminal and the edge blending device are connected by a network.

In this way, by connecting the control terminal and each edge blending device by the network, it is possible to easily carry out the control of the large number of edge blending devices, and it is possible to easily respond to the increase or reduction in the number, the replacement and the like of the projectors configuring the multi-projection system.

(13) In the multi-projection system according to any of the heretofore described (10) to (12), it is preferable that the light shielding unit holder includes, in the light shielding pattern formation portions, a light shielding pattern formation portion having formed therein a light shielding pattern which completely shields the projection light from the projection unit, and that the light shielding pattern drive controller drives the light shielding unit holder in such a way that, with respect to a projection unit which carries out no projection in accordance with the display mode, the light shielding pattern formation portion having formed therein the light shielding pattern which completely shields the projection light is positioned corresponding to the projection light from the projection unit.

By this means, as it is possible to cause the projection not to be carried out by means of the light shielding pattern which completely shields the projection lights from the projectors serving as the projection units, there is no need to turn off the lamp serving as the light source of the projector. Consequently, in addition to there being no increase in the number of times the lamp of the projector is turned on, the lamp luminance does not change either, and a light of the same luminance is projected, meaning that it is possible to provide a multi-projection system which, while preventing the lamp life from being shortened, has a luminance difference suppressed in various display modes.

(14) Also, a light shielding device of the invention being a light shielding device which shields a projection light projected from a projection unit onto a screen, it is preferable that the device is characterized by including: a light shielding unit holder which includes a plurality of light shielding pattern formation portions having formed therein two kinds of light shielding pattern, an opening pattern which can transmit the projection light from the projection unit, and a shielding pattern which can shield the projection light from the projection unit; and a light shielding pattern drive controller which controls a drive of the light shielding unit holder in order to cause one of the two kinds of light shielding pattern formation portion to correspond to the projection light from the projection unit.

By this means, in a condition in which the lamp is turned on, by transmitting the projection lights from the projectors by means of the opening pattern, and shielding them by means of the shielding pattern, the projectors serving as the projection units can be used as the projectors which carry out the projection and the projectors which carry out no projection. Consequently, as the projectors can be placed in the projection and non-projection conditions without repeating the turning-on and off of the lamp, it is possible to prevent the lamp life from being shortened. Also, as the lamp is continuously on, it is possible to obtain a normally used luminance at a time of a projection start.

(15) In the light shielding device according to the heretofore described (14), it is preferable that the light shielding unit holder further includes a light shielding pattern formation portion in which a light shielding pattern corresponding to an overlap area in which projection lights projected from a plurality of projection units onto the screen overlap each other is formed as the opening pattern, wherein the light shielding pattern drive controller controls the drive of the light shielding unit holder in such a way that light shielding pattern formation portions corresponding to the overlap area are positioned corresponding to the projection lights from the projection units which form the overlap area.

By this means, for example, in the event that an increase in the luminance of the projection screen which occurs due to the projection lights overlapping each other is unacceptable in terms of a display quality of the projection screen, the increase in the luminance can be suppressed by a light shielding pattern corresponding to the overlap area in which the projection lights overlap each other. Consequently, as the projectors serving as the projection units can be placed in the projection and non-projection conditions including the light shielding pattern corresponding to the overlap area of the projection lights, as well as it being possible to prevent the lamp life from being shortened, it is possible to obtain a projection screen having a good display quality.

(16) Also, the multi-projection system of the invention being a multi-projection system including: a plurality of projection units; and a light shielding device which shields projection lights projected from the projection units onto a screen, the light shielding device including: a light shielding unit holder including a plurality of light shielding pattern formation portions having formed therein two kinds of light shielding pattern, an opening pattern which can transmit the projection light from the projection unit and a shielding pattern which can shield the projection light from the projection unit; and a light shielding pattern drive controller which controls a drive of the light shielding unit holder in order to cause one of the two kinds of light shielding pattern formation portion to correspond to the projection light from the projection unit. In this case, it is preferable that the light shielding pattern drive controller, based on a display mode indicating a combination of projection units, among the plurality of projection units, which carry out a projection, (i) drives the light shielding unit holders, with respect to projection units which are to carry out the projection in accordance with the display mode, in such a way that the opening patterns are positioned corresponding to the projection lights from the relevant projection units, and (ii) drives the light shielding unit holders, with respect to projection units which carry out no projection in accordance with the display mode, in such a way that the shielding patterns are positioned corresponding to the projection lights from the relevant projection units.

By this means, a plurality of projectors serving as the projection units, in the condition in which the lamp is turned on, by transmitting the projection lights from the projectors by means of the opening pattern, and shielding them by means of the shielding pattern, is used as the projectors which carry out the projection and the projectors which carry out no projection. Consequently, regardless of a set display mode, there is no need to turn off the lamp serving as the light source of the projector. As a result, in addition to there being no increase in the number of times the lamp of the projector is turned on, the lamp luminance does not change either, and the light of the same luminance is projected, meaning that it is possible to provide the multi-projection system which, while preventing the lamp life from being shortened, has the luminance difference suppressed in various display modes.

BRIEF DESCRIPTION OF THE DRAWINGS

FIGS. 11A to 11F show examples of light shielding patterns other than the light shielding patterns shown in FIGS. 10A to 10D.

DETAILED DESCRIPTION OF THE EMBODIMENT(S) OF THE INVENTION

Hereafter, the invention will be described based on an embodiment. A description will be given, first, of an edge blending device and, subsequently, of a multi-projection system using the edge blending device. Subsequently again, a description will be given of a light shielding device and the multi-projection system using the light shielding device.

(Edge Blending Device)

Figure 1:
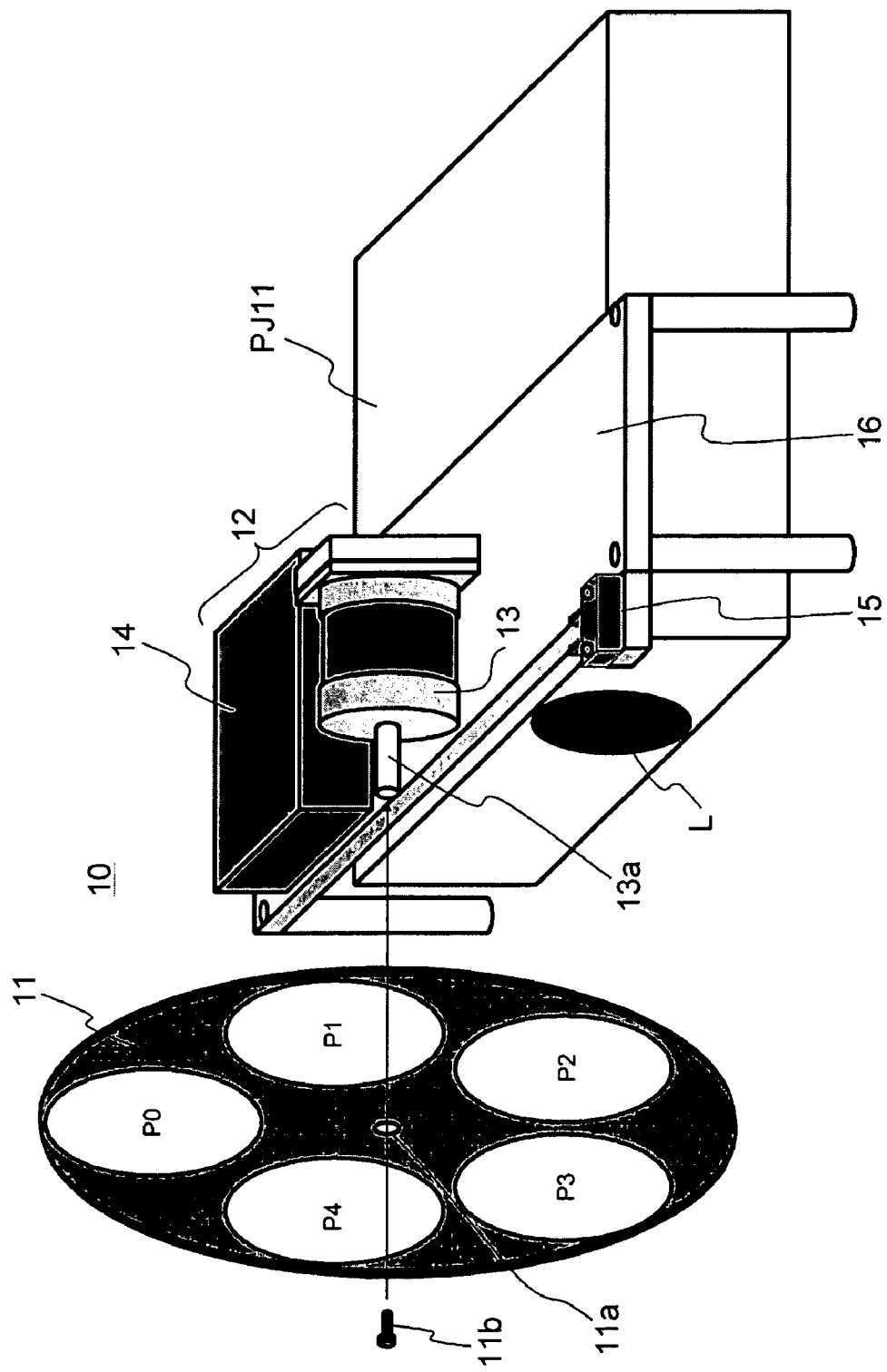
FIG. 1 shows a configuration of an edge blending device according to an embodiment of the invention.

FIG. 1 shows a configuration of an edge blending device according to the embodiment of the invention. An edge blending device 10 according to the embodiment is installed corresponding to each of a plurality of projectors PJ11 to PJ73 (refer to FIG. 6) serving as projection units configuring the multi-projection system. In FIG. 1, a description will be given of an edge blending device corresponding to one certain projector (the projector PJ11) but edge blending devices corresponding to the other projectors also have the same configuration.

As shown in FIG. 1, the edge blending device 10 includes a light shielding unit holder 11 which, being formed of a disk-like member, includes a plurality of light shielding pattern formation portions (to be described hereafter), a light shielding pattern drive controller 12 (including a motor 13 and a motor controller 14) which, by rotating the light shielding unit holder 11, controls a drive of the light shielding pattern formation portions, and an initial position detection sensor 15 for accurately detecting an initial position of the light shielding unit holder 11, as well as a component part attachment table 16 which, having the light shielding pattern drive controller 12, the initial position detection sensor 15 and the like attached thereto, is installed in such a way as to straddle a part of side surfaces and an upper end surface of a housing of the projector PJ11. A stepping motor is used as the motor 13.

The light shielding unit holder 11 has a central portion 11a secured to a rotary shaft 13a of the motor 13 by means of a screw 11b or the like. Also, in the light shielding unit holder 11, the light shielding pattern formation portions P0 to P4 with a plurality (five) of circular or rectangular (in FIG. 2, circular) openings are provided in a concentric circle at equal intervals. The light shielding pattern formation portions P0 to P4, by a light shielding plate 20 (refer to FIGS. 3A to 3D) being attached thereto, form a desired light shielding pattern.

The light shielding pattern formation portions P0 to P4 are formed in such a way that their centers are positioned at equal distances from the central portion 11a on line segments which, being at an angle of 72 degrees to each other, pass through the central portion 11a of the light shielding unit holder 11. Also, the light shielding pattern formation portions P0 to P4, in a condition in which no light shielding plate is attached thereto, have a diameter which can completely transmit a projection light from the projector PJ11 (which prevents a "vignetting" of the projection light).

Figure 2:
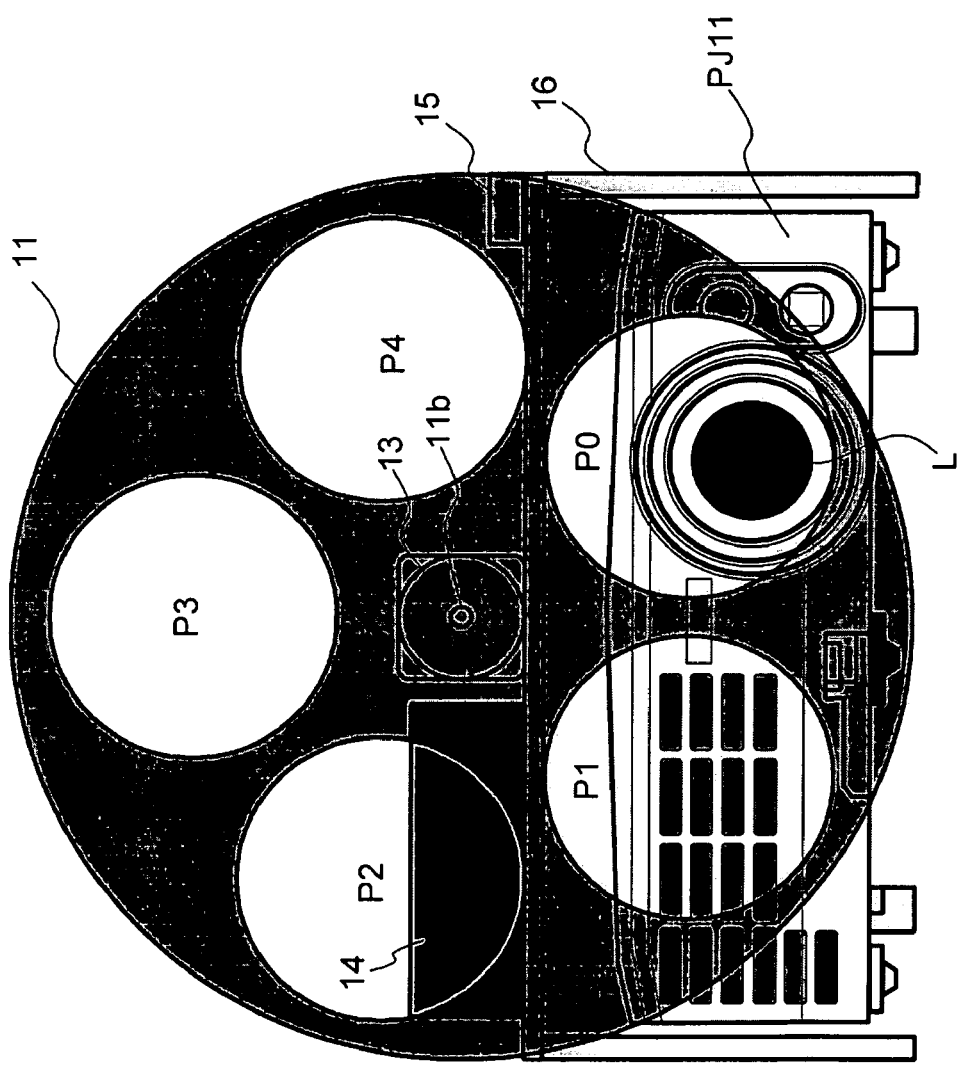
FIG. 2 is a front view of FIG. 1 as seen from a side of a light shielding unit holder.

FIG. 2 is a front view of FIG. 1 as seen from the light shielding unit holder 11 side. As shown in FIG. 2, the light shielding unit holder 11 is provided in such a way that, by its rotating, each light shielding pattern formation portion P0 to P4 is sequentially placed in a position corresponding to the projection light from the projector PJ11, that is, in the example in FIG. 2, a position facing a projection lens L of the projector PJ11. At this time, a light shielding pattern formation portion facing the projection lens L of the projector PJ11, as shown in FIG. 2, is positioned facing the projection lens L in such a way that it can completely transmit the projection light from the projector PJ11 in the condition in which no light shielding plate is attached thereto.

Then, by rotating the motor 13 through an angle of 72 degree units from the initial position of the light shielding unit holder 11 (herein, a position in which the light shielding pattern formation portion P0 faces the projection lens L of the projector PJ11 is defined as the initial position), the other light shielding pattern formation portions P1 to P3 can also be sequentially positioned facing the projection lens L of the projector PJ11.

A detection of the initial position of the light shielding unit holder 11 can be carried out by an initial position detection sensor (a photointerrupter or the like) 15 detecting a notch or a projection (not shown) provided on the light shielding unit holder 11. Initial position detection unit is configured of the initial position detection sensor 15 and the notch or projection (not shown) provided on the light shielding unit holder 11.

Also, the motor controller 14 of the light shielding pattern drive controller 12 is provided with communication unit for enabling a control terminal 40 (refer to FIG. 5) to remotely control a switching of the light shielding pattern and the like.

As the communication unit, it is possible to use, for example, so-called LAN communication unit, such as a TCP/IP, or serial communication unit, such as EIA232 (RS232C) or a USB.

Figure 3D:
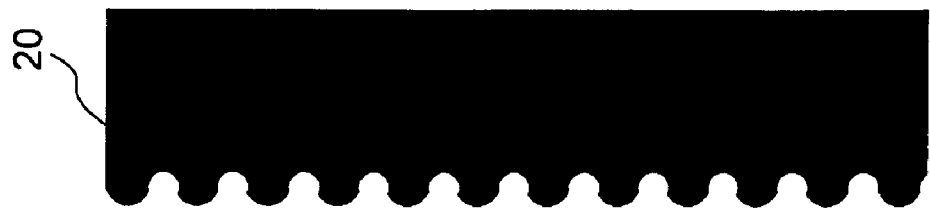
FIGS. 3A to 3D each show an example of a light shielding plate attached to a light shielding pattern formation portion.
Figure 3C:
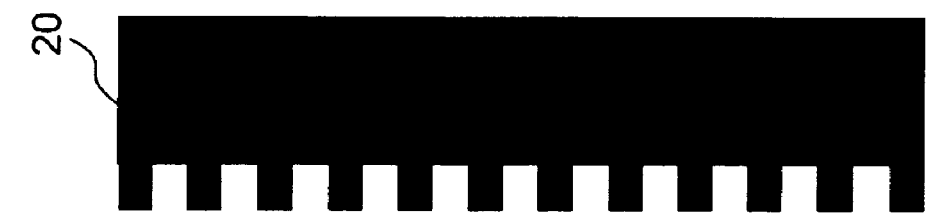
Figure 3B:
Figure 3A:
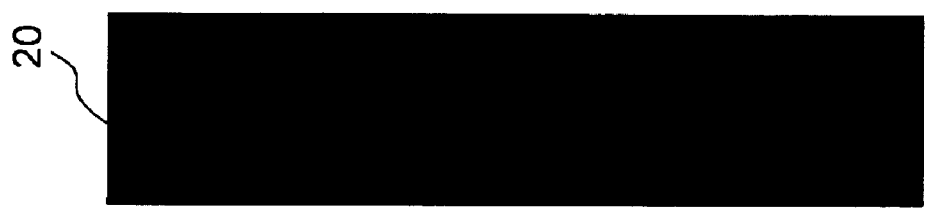

FIGS. 3A to 3D each show an example of the light shielding plate 20 attached to the light shielding pattern formation portions P0 to P4. The light shielding plate 20, being formed of a rectangular plate-like member, can use various kinds of edge shape. FIG. 3A shows a light shielding plate 20 of which the edge shape is linear, FIG. 3B shows a light shielding plate 20 of which the edge shape is serrated, FIG. 3C shows a light shielding plate 20 of which the edge shape is crenellated, and FIG. 3D shows a light shielding plate 20 of which the edge shape is waved. In the embodiment of the invention, the light shielding plate 20 shown in FIG. 3A is used. It is acceptable that the light shielding plate 20 partially covers the opening of the light shielding pattern formation portions P0 to P4, and it is also acceptable that it covers a whole of the opening. Also, it is acceptable that the light shielding plate 20 is an opaque member, and it is also acceptable that it is a member in which a desired light shielding pattern is formed by forming an opaque portion or a dark filter portion in a transparent material, or by forming a gradation portion in which a transparency varies gradually.

Figure 4:
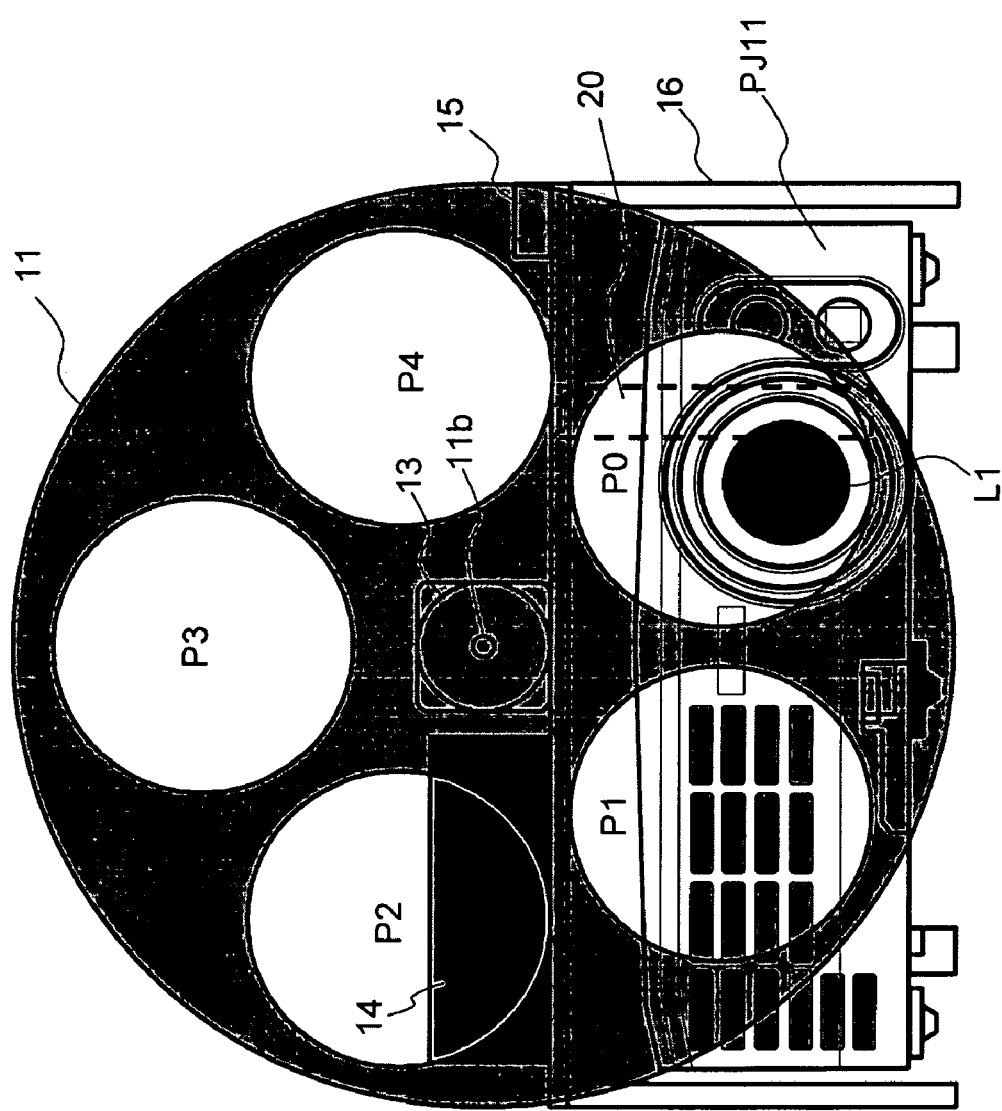
FIG. 4 shows an example in which the light shielding plate shown in FIG. 3A is attached to the light shielding pattern formation portion.

FIG. 4 shows an example in which the light shielding plate 20 shown in FIG. 3A is attached to the light shielding pattern formation portion P0. In the example of FIG. 4, an example is shown in which one light shielding plate 20 (shown in broken lines) is attached in such a way as to correspond to an overlap area occurring in a longitudinal direction of the projection light from the projector PJ11. In this case, it is possible to obtain the same advantage as that of the light shielding plate 20 with respect to the projector PJ11 described in FIGS. 15A and 15B and FIGS. 16A and 16B.

Although, in FIG. 4, the case has been shown in which the one light shielding plate 20 is attached in a vertically long direction to the light shielding pattern formation portion P0, without being limited to the vertically long direction, a horizontally long direction is acceptable, and moreover, by combining a plurality of the light shielding plates 20, it is possible to form a desired light shielding pattern, such as an L-shaped one or a squared U-shaped one. In this way, by changing a position of attachment of the light shielding plate 20 to the light shielding pattern formation portions P0 to P4, or combining the plurality of light shielding plates 20, it is possible to form various light shielding patterns. Specific examples of the light shielding patterns will be described hereafter.

Also, the attachment of the light shielding plate 20 to the light shielding pattern formation portions P0 to P4 is carried out by using some attachment units to secure both lengthwise ends of the light shielding plate 20 to a disk surface of the light shielding unit holder 11 outside the light shielding pattern formation portions P0 to P4. As the attachment unit, it is possible to use various attachment units such as, for example, a magnet, a magic tape (registered trademark) or a screwing, but it is preferable that it is attachment units with which it is easy to attach and detach the light shielding plate 20, and no displacement or the like occurs in the attached light shielding plate 20.

In this way, "attaching the light shielding plate 20 to the light shielding pattern formation portions P0 to P4", practically, as described heretofore, refers to "securing both lengthwise ends of the light shielding plate 20 to the disk surface of the light shielding unit holder 11 outside the light shielding pattern formation portions P0 to P4" but, in the embodiment, this is expressed as "attaching the light shielding plate 20 to the light shielding pattern formation portions P0 to P4".

According to the heretofore described kind of edge blending device according to the embodiment of the invention, by attaching the light shielding plates 20, one to each of five light shielding pattern formation portions P0 to P4 provided in the light shielding unit holder 11, in such a way that light shielding patterns differing from one another are formed, it is possible to use five kinds of light shielding pattern by switching between them. As the switching between the five kinds of light shielding pattern is carried out simply by rotating the light shielding unit holder 11 through every 72 degrees by means of the motor (stepping motor) 13, a mechanism and a control for switching the light shielding pattern become very simple.

Also, by changing the position of attachment of the light shielding plate 20 to the light shielding pattern formation portions P0 to P4, or combining the plurality of light shielding plates 20, as it is possible to form various light shielding patterns, it is possible to easily respond to a change in a pattern in the overlap area (including a change in a width of the overlap area too).

Consequently, by using the edge blending device according to the embodiment in the multi-projection system to be described hereafter, it is possible to rapidly switch the light shielding pattern in response to a switching of a display mode of the multi-projection system.

(Multi-projection System) Next, a description will be given of the multi-projection system according to the embodiment of the invention.

Figure 5:
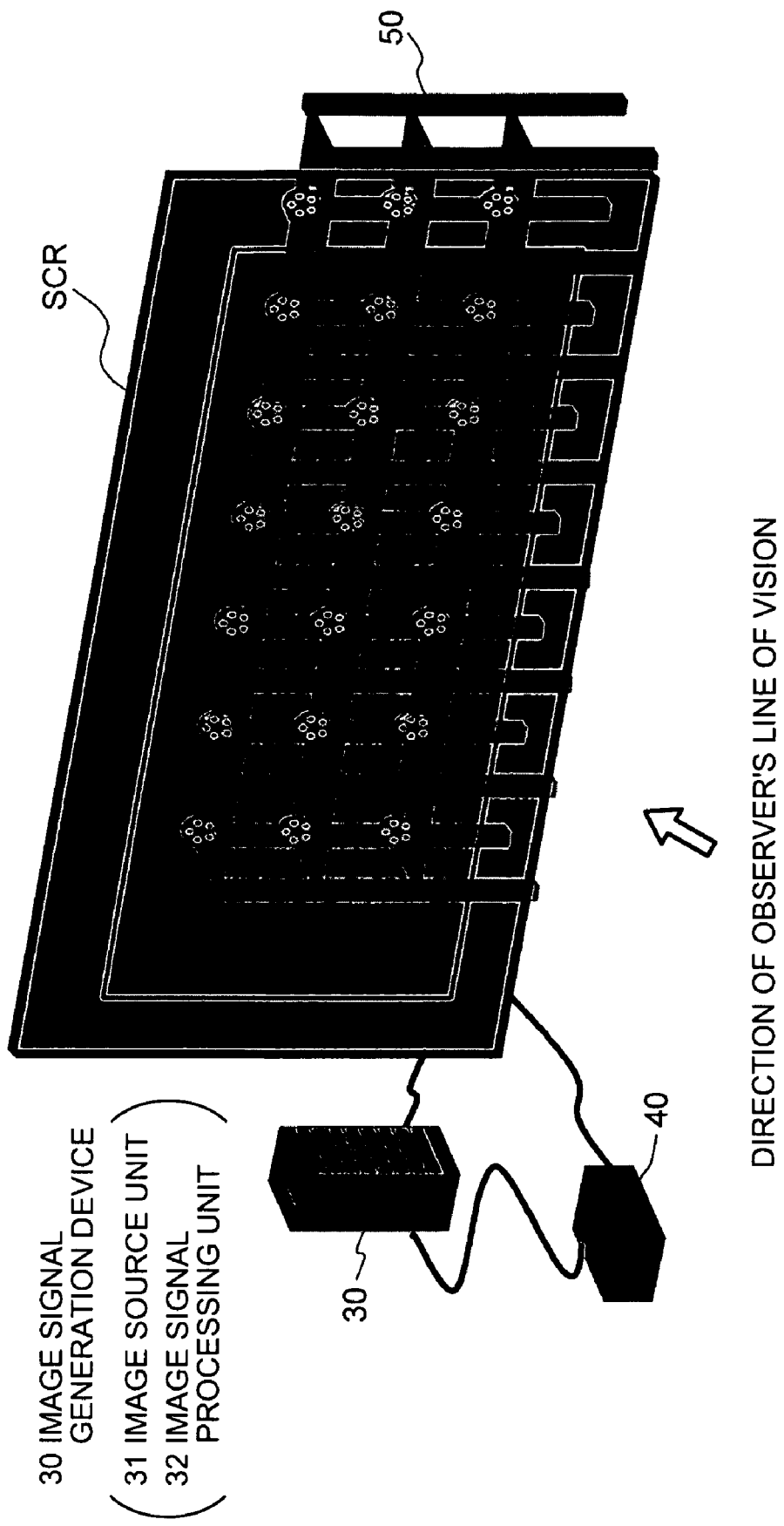
FIG. 5 shows a configuration of a multi-projection system according to the embodiment.

FIG. 5 shows a configuration of the multi-projection system according to the embodiment. The multi-projection system according to the embodiment is a rear projection type multi-projection system.

As shown in FIG. 5, the multi-projection system according to the embodiment includes a screen SCR, a plurality of projectors arranged in such a way that an overlap area is formed between adjacent projection lights (refer to FIG. 6), an image signal generation device 30, and a control terminal 40. The plurality of projectors is installed on a rack 50, and each projector is provided with the edge blending device 10 already described in FIG. 1 etc.

The screen SCR, being a transmissive screen for use in a back projection, preferably has a high diffusion performance so that an edge blending area, when seen from an observer side, is difficult to perceive from any angle.

The image signal generation device 30 includes an image source unit (a television tuner, a video disc player, a personal computer or the like) 31 which can transmit an image signal, and an image signal processing unit 32 which, based on the image signal from the image source unit 31, generates an image signal to be projected by each projector, and distributes the generated image signal to each projector. It is acceptable that the image source unit 31 is provided in an exterior.

The control terminal 40 has a function of controlling a whole of the system. Specifically, it has a function of giving each control signal corresponding to a display mode set by a user or the like to the image signal processing unit 32 and each edge blending device 10. It is preferable that a network provides a connection between the control terminal 40 and the image signal processing unit 32, and between the control terminal 40 and each edge blending device 10. A connection form may be either wired or wireless.

Also, in order for the control terminal 40 to control each edge blending device 10, as described heretofore, it is possible to use various communication unit. For example, in the case of using the TCP/IP, an appropriate IP address belonging to an identical network domain is allotted in advance to each edge blending device 10. Meanwhile, the control terminal 40 also including the TCP/IP communication unit, an appropriate IP address belonging to the network domain identical to that of the edge blending devices 10 is allotted in advance to the control terminal 40.

Figure 6:
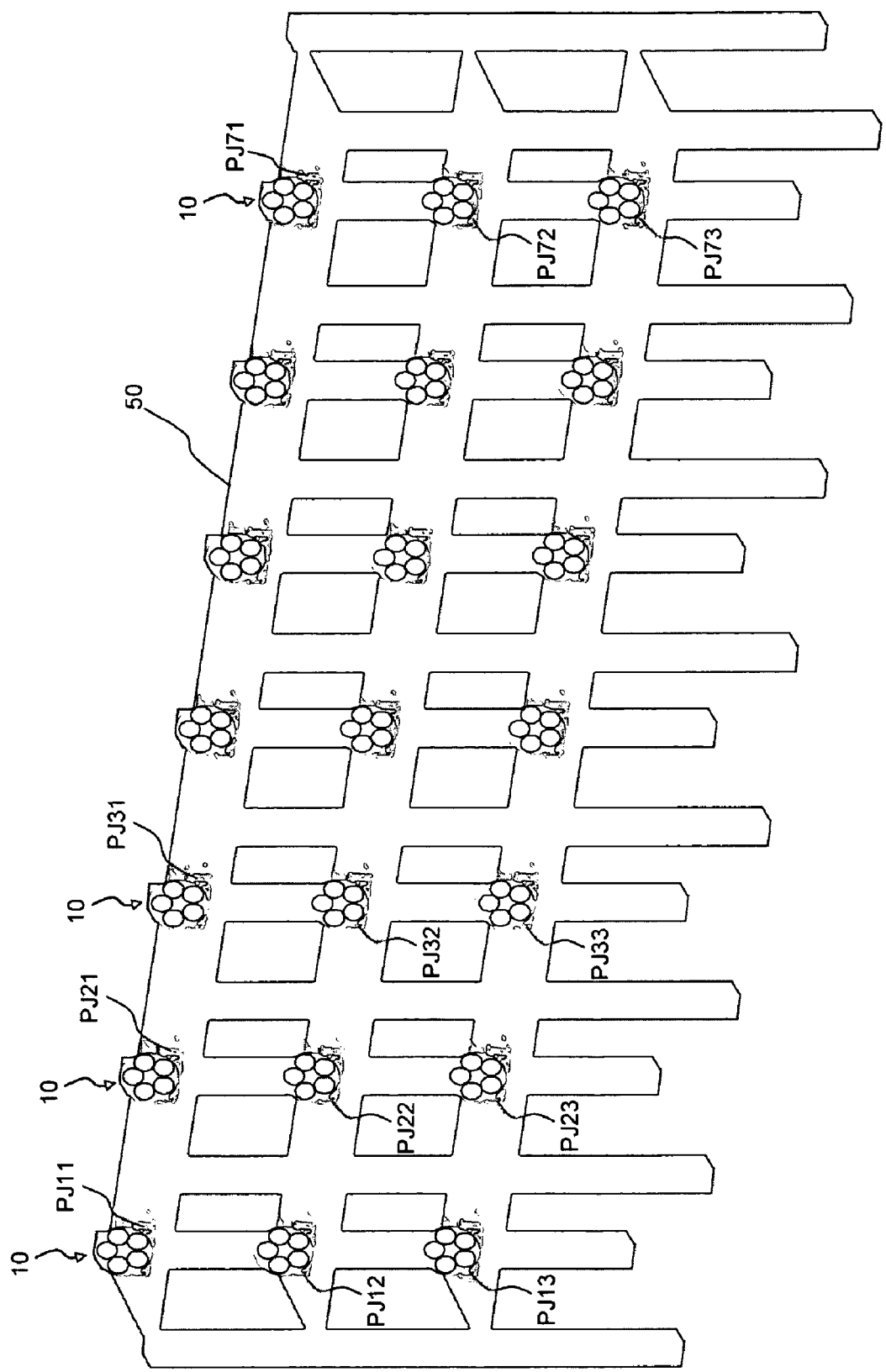
FIG. 6 shows an arrangement of a plurality of projectors used in the multi-projection system according to the embodiment.

FIG. 6 shows an arrangement of the plurality of projectors used in the multi-projection system according to the embodiment. As shown in FIG. 6, the plurality of projectors used in the multi-projection system according to the embodiment includes a total of 21 projectors, seven in a horizontal direction by three in a vertical direction. In FIG. 6, when vertical arrays, being referred to as columns, are considered to have a first column, a second column, etc. in order from the right of the figure, three projectors exist in each column.

Then, projectors in the first column are designated by reference characters PJ11, PJ12 and PJ13 in order from the top, projectors in the second column are designated by reference characters PJ21, PJ22 and PJ23, projectors in the third column are designated by reference characters PJ31, PJ32 and PJ33, and projectors in the seventh column are designated by reference characters PJ71, PJ72 and PJ73. In this way, the 21 projectors are designated by reference characters PJ11 to PJ73. In FIG. 6, in order to avoid a complication in the figure, a part of the reference character allotted to each projector and the reference character allotted to each edge blending device is omitted.

The individual projectors PJ11 to PJ73 are installed on the kind of rack 50 shown in the figure in such a way that adjacent projectors are spaced a prescribed distance apart from each other in the vertical direction and the horizontal direction. Also, each projector PJ11 to PJ73 is provided with the edge blending device 10 already described in FIG. 1 etc.

Figure 7:
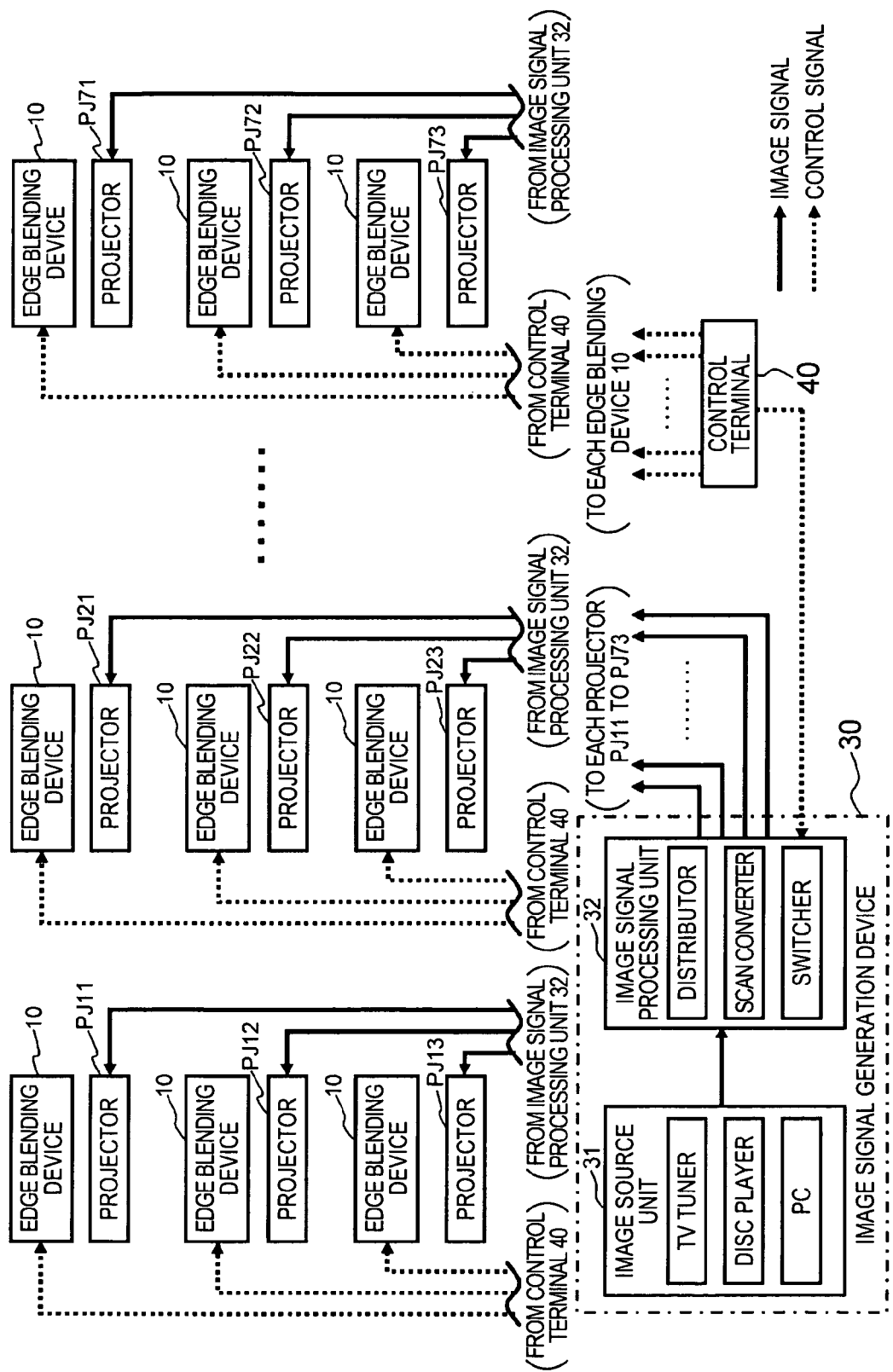
FIG. 7 is a block diagram showing the configuration of the multi-projection system according to the embodiment.

FIG. 7 is a block diagram showing a configuration of the multi-projection system according to the embodiment. The image signal processing unit 32 of the image signal generation device 30, including a distributor, a scan converter, a switch and the like, has a function of, based on the image signal from an image source unit 31 such as the TV tuner, the disc player, the personal computer (PC) or the like, generating an image signal to be projected by each projector PJ11 to PJ73, and distributing the generated image signal to each projector PJ11 to PJ73.

The control terminal 40 has a function of giving a control signal (referred to as an image processing control signal) corresponding to the set display mode to the image signal processing unit 32, and a function of giving a control signal (referred to as a light shielding pattern control signal) corresponding to the similarly set display mode to each edge blending device 10.

When the image processing control signal is given to the image signal processing unit 32 from the control terminal 40, the image signal processing unit 32, based on the given image processing control signal, with respect to projectors which are to carry out a projection in the set display mode, generates an image signal related to a projection image to be displayed by each of the projectors, and distributes the generated image signal to the corresponding projector.

Meanwhile, when the light shielding pattern control signal is given to each edge blending device 10 from the control terminal 40, in each edge blending device 10, the motor controller 14 of the light shielding pattern drive controller 12 receives the given light pattern control signal, and rotates the light shielding unit holder 11 through a prescribed angle.

Figure 8:
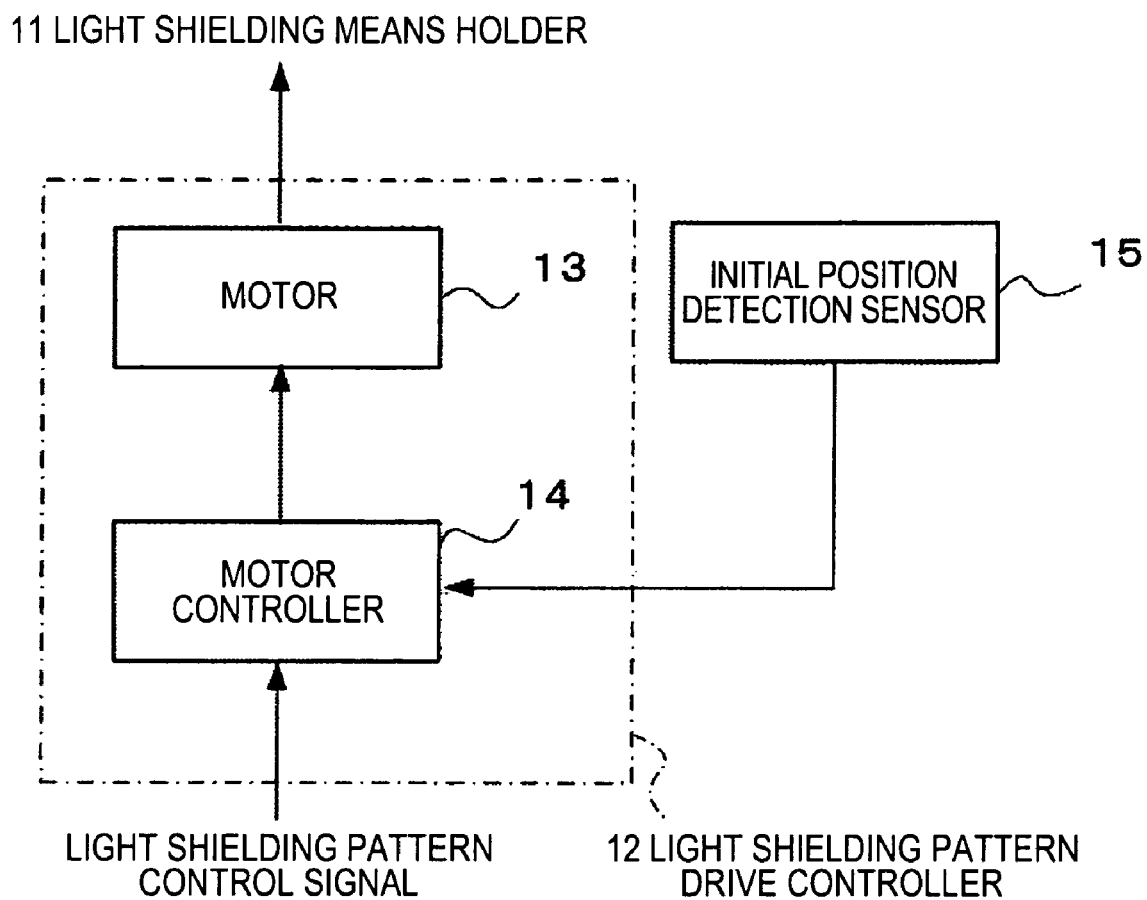
FIG. 8 illustrates a control system of each edge blending device.

FIG. 8 illustrates a control system of each edge blending device 10. The control system of each edge blending device 10 includes the initial position detection sensor 15, the motor 13 serving as the light shielding pattern drive controller 12, and the motor controller 14.

The initial position detection sensor 15 is for accurately setting the initial position of the light shielding unit holder 11. That is, in order to set the initial position of the light shielding unit holder 11, firstly, the light shielding unit holder 11 is rotated by a drive of the motor 13. Then, when the initial position detection sensor 15 detects the notch or projection provided in advance on the light shielding unit holder 11, the detection signal from the initial position detection sensor 15 is given to the motor controller 14, and the motor controller 14 stops the rotation of the motor 13 using a prescribed number of steps.

A position in which the light shielding unit holder 11 is placed when the rotation of the motor 13 stops is taken as the initial position of the light shielding unit holder 11. In the multi-projection system according to the embodiment, a position in which the light shielding pattern formation portion P0 of each edge blending device 10 is placed facing the projection lens L of each projector PJ11 to PJ73 is taken as the initial position of the light shielding unit holder 11.

Also, the light shielding pattern control signal from the control terminal 40 is also given to the motor controller 14 and, based on the light shielding control signal, by the motor 13 rotating through every prescribed angle (72 degrees), the light shielding unit holder 11 similarly rotates through every 72 degrees, carrying out a light shielding pattern switching operation.

Next, a specific description will be given of an operation of the multi-projection system according to the embodiment. In the multi-projection system according to the embodiment, by changing the combination of projectors, among the projectors PJ11 to PJ73 configuring the multi-projection system, which carry out the projection, it is possible to switch the display mode on the screen SCR between a plurality of kinds prepared in advance.

FIGS. 9A to 9D each show an example of the display mode prepared in the multi-projection system according to the embodiment. In FIGS. 9A to 9D, among projection screens corresponding to the (7×3) projectors, seven in the horizontal direction by three in the vertical direction, outline projection screens are the projection screens corresponding to the projectors which carry out the projection.

Figure 9B:
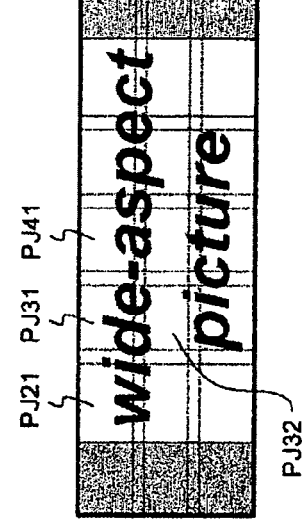
FIGS. 9A to 9D each show an example of a display mode prepared in the multi-projection system according to the embodiment.
Figure 9D:
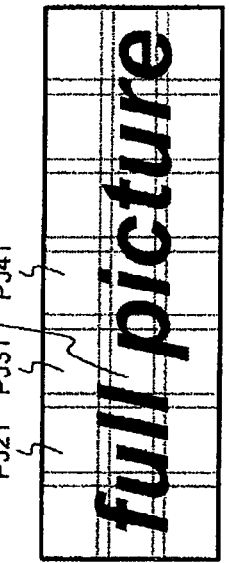
Figure 9A:
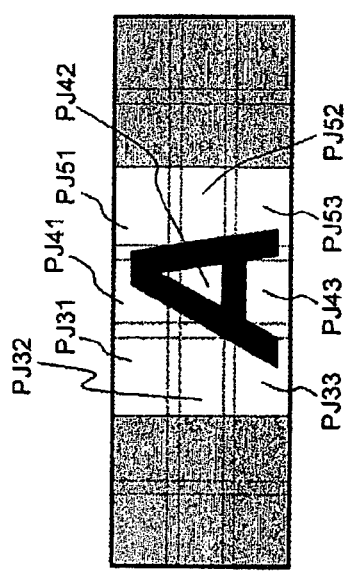
Figure 9C:
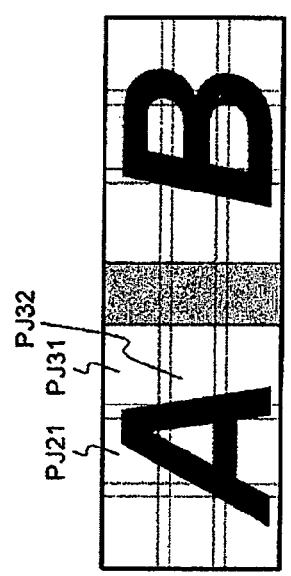

Consequently, FIG. 9A shows a display mode (referred to as a display mode M0) in which only (3×3) projectors in central three columns, among the 7×3 projectors PJ11 to PJ73, carry out the projection, FIG. 9B shows a display mode (referred to as a display mode M1) in which only (5×3) projectors in central five columns, excepting one column at each end, carry out the projection, FIG. 9C shows a display mode (referred to as a display mode M2) in which only (3×3) projectors in three columns on each of the left and right, excepting one central vertical column, carry out the projection, and FIG. 9D shows a display mode (referred to as a display mode M3) in which the (7×3) projectors in all the seven columns carry out the projection.

The multi-projection system according to the embodiment enables a switchable display of these four kinds of display mode M0 to M3. A consideration will be given of light shielding patterns necessary with respect to a projection light from each projector (each projector which carries out the projection) in these four kinds of display mode M0 to M3.

In the four kinds of display mode M0 to M3 shown in FIGS. 9A to 9D, the light shielding pattern necessary with respect to the projection light from each projector which carries out the projection differs depending on a pattern of the overlap area formed between adjacent projection lights in each display mode. Herein, the projector PJ31 which projects the uppermost projection screen in the third column from the left in FIGS. 9A to 9D will be described as an example.

FIGS. 10A to 10D show light shielding patterns necessary with respect to a projection light from the projector PJ31 in the four kinds of display mode M0 to M3 shown in FIGS. 9A to 9D.

Figure 10A:
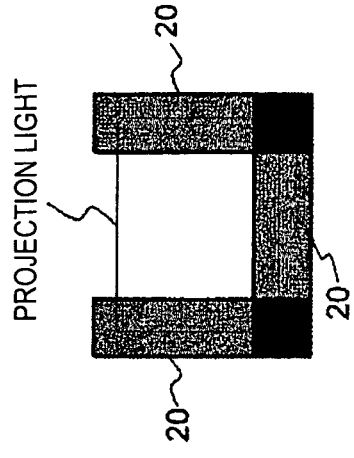
FIGS. 10A to 10D show light shielding patterns necessary with respect to a projection light from a projector in the four kinds of display mode shown in FIGS. 9A to 9D.

In a case in which the display mode is switched to the display mode M0 shown in FIG. 9A, as the projection light from the projector PJ31, in a left and right relationship, forms an overlap area with the projection light from the uppermost projector PJ41 in the fourth column and, in an up and down relationship, forms an overlap area with the projection light from the middle projector PJ32 in the third column, a kind of light shielding pattern shown in FIG. 10A is formed using two light shielding plates 20 in such a way as to correspond to the individual overlap areas. The light shielding pattern in FIG. 10A is formed in the light shielding pattern formation portion P0 of the edge blending device 10 furnished on the projector PJ31.

Figure 10B:
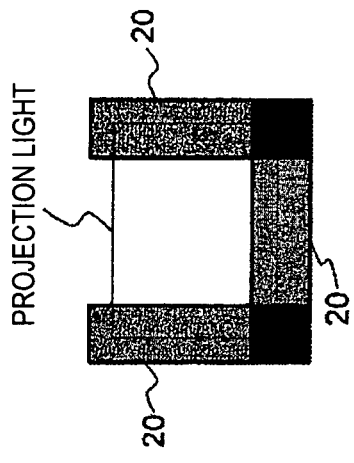

Also, in a case in which the display mode is switched to the display mode M1 shown in FIG. 9B, as the projection light from the projector PJ31, in a left and right relationship, forms an overlap area with the projection light from each of the uppermost projector PJ21 in the second column and the uppermost projector PJ41 in the fourth column and, in an up and down relationship, forms an overlap area with the projection light from the middle projector PJ32 in the third column, a kind of light shielding pattern shown in FIG. 10B is formed using three light shielding plates 20 in such a way as to correspond to the individual overlap areas. The light shielding pattern in FIG. 10B is formed in the light shielding pattern formation portion P1 of the edge blending device 10 furnished on the projector PJ31.

Figure 10C:
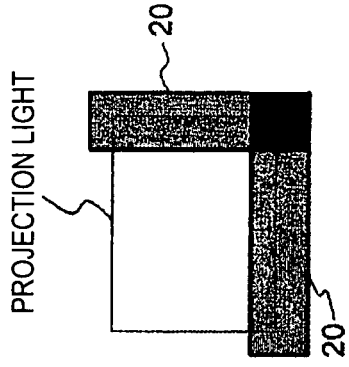

Also, in a case in which the display mode is switched to a kind of display mode M2 shown in FIG. 9C, as the projection light from the projector PJ31, in a left and right relationship, forms an overlap area with the projection light from the uppermost projector PJ21 in the second column and, in an up and down relationship, forms an overlap area with the projection light from the middle projector PJ32 in the third column, a kind of light shielding pattern shown in FIG. 10C is formed using two light shielding plates 20 in such a way as to correspond to the individual overlap areas. The light shielding pattern in FIG. 10C is formed in the light shielding pattern formation portion P2 of the edge blending device 10 furnished on the projector PJ31.

Figure 10D:
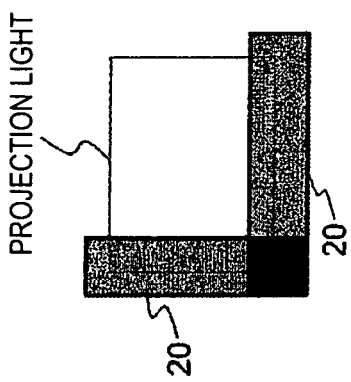

Also, in a case in which the display mode is switched to a kind of display mode M3 shown in FIG. 9D, as in FIG. 10B, as the projection light from the projector PJ31, in a left and right relationship, forms an overlap area with the projection light from each of the uppermost projector PJ21 in the second column and the uppermost projector PJ41 in the fourth column and, in an up and down relationship, forms an overlap area with the projection light from the middle projector PJ32 in the third column, a kind of light shielding pattern shown in FIG. 10D is formed using three light shielding plates 20 in such a way as to correspond to the individual overlap areas. The light shielding pattern in FIG. 10D is formed in the light shielding pattern formation portion P3 of the edge blending device 10 furnished on the projector PJ31. The light shielding pattern in FIG. 10D is the same as that in FIG. 10B.

In the heretofore described examples, as the four kinds of light shielding pattern in FIGS. 10A to 10D are formed in the four light shielding pattern formation portions P0 to P3 of the edge blending device 10, the light shielding pattern formation portion P4 of the edge blending device 10 remains. The remaining light shielding formation portion P4 can also remain opened with no light shielding plate 20 attached thereto, providing for a case of confirming a projection screen of a corresponding projector (in this example, the projector PJ31) or using the projector independently, and a like case, and can be used in various applications, such as being used to attach a light shielding plate when realizing another display mode.

When using the four kinds of display mode M0 to M3 in FIGS. 9A to 9D, in projectors which carry out no projection (for example, when using the display mode M0 shown in FIG. 9A, projectors in two columns on each of the left and right) in each display mode, it is sufficient that a light shielding plate (not shown), which can completely shield a light shielding pattern formation portion (for example, in the event of the display mode M0, the light shielding pattern formation portion P0) corresponding to each display mode of the light shielding unit holder 11 of an edge blending device 10 corresponding to each projector, is attached to the relevant light shielding pattern formation portion P0. By this means, as it is possible to cause the projection not to be carried out by means of the light shielding pattern which completely shields the projection light from the projector, there is no need to turn off a lamp serving as a light source of the projector. Consequently, as there is no increase in a number of times the lamp of the projector is turned on, and the lamp also continues to project a light of the same luminance, it is possible to provide a multi-projection system which, while preventing a lamp life from being shortened, has a luminance difference between projection screens suppressed in various display modes. Naturally, with respect to the various display modes, in a case in which the display mode is not frequently changed or a like case, it is acceptable, as necessary, to power off the relevant projector regardless of the light shielding pattern or the like.

Also, in the case of using the four kinds of display mode M0 to M3 shown in FIGS. 9A to 9D, with respect to the projector PJ31, although it is sufficient that the kinds of light shielding pattern shown in FIGS. 10A to 10D are formed in the light shielding pattern formation portions P0 to P3 of the corresponding edge blending device 10, even in the case of the same display mode, depending on a projector, the light shielding pattern, which is formed in each light shielding pattern formation portion P0 to P3 of an edge blending device 10 corresponding to the projector, differs in shape.

For example, with respect to the projector PJ41, in the case of the display mode M0 shown in FIG. 9A, a light shielding pattern necessary with respect to the projection light from the projector PJ41 is the light shielding pattern in FIG. 10B, and this kind of light shielding pattern is formed in the light shielding pattern formation portion P0 of an edge blending device 10 corresponding to the projector PJ41 itself. Also, in the case of the projector PJ41, it is sufficient that the light shielding pattern in the case of the display mode m1 shown in FIG. 9B is also the same as that in FIG. 10B, and this kind of light shielding pattern is formed in the light shielding pattern formation portion P1. Also, in the case of the display mode M2 shown in FIG. 9C, as the projector PJ41 carries out no projection, a light shielding plate (not shown) which can completely shield the light shielding pattern formation portion P2 is attached to the pattern formation portion P2. Also, a light shielding pattern in the case of the display mode M3 shown in FIG. 9D is made the same as that in FIG. 10D (the same as that in FIG. 10B), and this kind of light shielding pattern is formed in the light shielding pattern formation portion P3.

FIGS. 11A to 11F show examples of light shielding patterns other than the light shielding patterns shown in FIGS. 10A to 10D. Although, in the heretofore described examples of the projectors PJ31 and PJ41, the light shielding patterns necessary in the four kinds of display mode M0 to M3 can be responded to by using any of those in FIGS. 10A to 10D, even in the event of the same display mode, there are some projectors which need light shielding patterns other than those in FIG. 10.

For example, with respect to the projector PJ32, in the display mode M0, a kind of light shielding pattern shown in FIG. 11A needs to be formed in the light shielding pattern formation portion P0 of the corresponding edge blending device 10 and, with respect to the projector PJ42, in the display mode M0, a kind of light shielding pattern shown in FIG. 11B needs to be formed in the light shielding pattern formation portion P0 of the corresponding edge blending device 10.

Also, with respect to the projector PJ52, in the display mode M0, a kind of light shielding pattern shown in FIG. 11C needs to be formed in the light shielding pattern formation portion P0 of the corresponding edge blending device 10 and, with respect to the projector PJ33, in the display mode M0, a kind of light shielding pattern shown in FIG. 11D needs to be formed in the light shielding pattern formation portion P0 of the corresponding edge blending device 10.

Also, with respect to the projector PJ43, in the display mode M0, a kind of light shielding pattern shown in FIG. 11E needs to be formed in the light shielding pattern formation portion P0 of the corresponding edge blending device 10 and, with respect to the projector PJ53, in the display mode M0, a kind of light shielding pattern shown in FIG. 11F needs to be formed in the light shielding pattern formation portion P0 of the corresponding edge blending device 10.

Also, in the case of the other display modes M1 to M3 too, each projector which carries out the projection in each of the display modes, as patterns of overlap areas formed by their projection lights differ from one another, forms a light shielding pattern corresponding to the pattern of the overlap area in each display mode.

Next, a description will be given of an operation of the multi-projection system with respect to a setting of a display mode by the user or the like.

A consideration will be given of a case in which the multi-projection system according to the embodiment carries out the switching of the display mode, for example, from a certain display mode other than the display mode M0 in which it is carrying out a display to the display mode M0.

Firstly, a setting of the display mode M0 is carried out from the control terminal 40. The control terminal 40, based on the setting of the display mode M0, gives the image processing control signal for carrying out an image processing corresponding to the set display mode M0 to the image signal processing unit 32. Also, it gives the light shielding pattern control signal for carrying out the switching of the light shielding pattern to the edge blending device 10 of each projector PJ11 to PJ73.

In projectors which carry out no projection in the display mode M0, the light shielding plate which can completely shield the light shielding pattern formation portion P0 is attached to the relevant light shielding pattern formation portion P0.

The image signal processing unit 32, based on the image processing control signal from the control terminal 40, with respect to projectors which are to carry out the projection in the display mode M0, generates an image signal related to a projection image to be displayed by each of the projectors, and distributes the generated image signal to the corresponding projector.

Meanwhile, in the edge blending device 10 of each projector PJ11 to PJ73, based on the light shielding pattern control signal from the control terminal 40, the motor controller 14 carries out a drive control of the motor 13. By this means, the light shielding unit holder 11 is rotationally controlled through a prescribed angle. That is, in this case, as the display mode M0 has been set, the light shielding unit holder 11 is rotationally controlled in such a way that the light shielding pattern formation portion P0 of each edge blending device 10 corresponding to each projector PJ11 to PJ73 is positioned facing the projection lens L of each projector PJ11 to PJ73.

At this time, the light shielding plate 20 is attached to the light shielding pattern formation portion P0 of an edge blending device 10 corresponding to the projector PJ31, among three upper ones of the projectors (the projectors in three central columns) which carry out the projection in the display mode M0, in such a way that a kind of light shielding pattern shown in FIG. 10A is formed, the light shielding plate 20 is attached to the light shielding pattern formation portion P0 of an edge blending device 10 corresponding to the projector PJ41 in such a way that a kind of light shielding pattern shown in FIG. 10B is formed, and the light shielding plate 20 is attached to the light shielding pattern formation portion P0 of an edge blending device 10 corresponding to the projector PJ51 in such a way that a kind of light shielding pattern shown in FIG. 10C is formed.

Also, the light shielding plate 20 is attached to the light shielding pattern formation portion P0 of an edge blending device 10 corresponding to the projector PJ32, among three middle projectors, in such a way that a kind of light shielding pattern shown in FIG. 11A is formed, the light shielding plate 20 is attached to the light shielding pattern formation portion P0 of an edge blending device 10 corresponding to the projector PJ42 in such a way that a kind of light shielding pattern shown in FIG. 11B is formed, and the light shielding plate 20 is attached to the light shielding pattern formation portion P0 of an edge blending device 10 corresponding to the projector PJ52 in such a way that a kind of light shielding pattern shown in FIG. 11C is formed.

Also, the light shielding plate 20 is attached to the light shielding pattern formation portion P0 of an edge blending device 10 corresponding to the projector PJ33, among three lower projectors, in such a way that a kind of light shielding pattern shown in FIG. 11D is formed, the light shielding plate 20 is attached to the light shielding pattern formation portion P0 of an edge blending device 10 corresponding to the projector PJ43 in such a way that a kind of light shielding pattern shown in FIG. 11E is formed, and the light shielding plate 20 is attached to the light shielding pattern formation portion P0 of an edge blending device 10 corresponding to the projector PJ53 in such a way that a kind of light shielding pattern shown in FIG. 11F is formed.

Consequently, in a case in which each projector which is to carry out the projection in the display mode M0 has carried out the projection, as a light shielding pattern corresponding to a pattern of each overlap area occurring between adjacent projection lights is formed in the overlap area, as described in FIGS. 15A and 15B and FIGS. 16A and 16B, it is possible to prevent a luminance from increasing in each overlap area.

Projection lights from projectors which carry out no projection in the display mode M0 (the projectors corresponding to the screens shown in gray in FIG. 9A) are completely shielded using light shielding plates, capable of a complete shielding, attached to the light shielding pattern formation portions P0 of edge blending devices 10 corresponding to the relevant projectors.

Also, it is taken, in the condition of this display mode M0, that a switching to the display mode M3 is carried out by the user or the like using the control terminal 40. In this case, the image signal processing unit 32, based on the image processing control signal from the control terminal 40, with respect to projectors which are to carry out the projection in the display mode M3 (in this case, all the 21 projectors PJ11 to PJ73), generates an image signal related to a projection image to be displayed by each projector PJ11 to PJ73, and distributes the generated image signal to the corresponding projector.

Meanwhile, in each edge blending device 10 corresponding to each projector PJ11 to PJ73, based on the light shielding pattern control signal from the control terminal 40, the motor controller 14 carries out the drive control of the motor 13. That is, although the previous display mode is the display mode M0, and the light shielding pattern formation portion P0 of each of edge blending devices 10 corresponding to the projectors PJ11 to PJ73 has been positioned facing the projection lens L of each projector, by a setting of the display mode M3 being carried out, the motor controller 14 carries out a control over the motor 13 in order to rotate it through 72 degrees×2=144 degrees in a counterclockwise direction as seen from a projector side. Needless to say, it is acceptable to rotate it through 72 degrees×3=216 degrees in a clockwise direction.

By this means, the light shielding unit holder 11 of the edge blending device 10 of each projector PJ11 to PJ73 is placed in a condition in which each light shielding pattern formation portion P3 faces the projection lens L of each projector PJ11 to PJ73.

At this time, in the light shielding pattern formation portions P3 of the edge blending devices 10 of all the projectors PJ11 to PJ73, the light shielding plate 20 is attached to each of the light shielding pattern formation portions P3 in such a way that kinds of light shielding pattern corresponding to overlap areas occurring in their projection lights in the display mode M3 shown in FIG. 9D are formed. Consequently, in the edge blending device 10 of each projector PJ11 to PJ73, a light shielding pattern corresponding to the display mode M3 shown in FIG. 9D is formed.

As above, although a description has been given of the cases of the display mode M0 and the display mode M3, the same operation is also carried out in a case in which a display is carried out in the display mode M1 and the display mode M2, whereby, in the case of the display mode M1, the light shielding pattern formation portion P1 of an edge blending device 10 corresponding to each projector PJ11 to PJ73 is positioned facing the projection lens L of each projector PJ11 to PJ73 and, in the case of the display mode M2, the light shielding pattern formation portion P2 of each edge blending device 10 corresponding to each projector PJ11 to PJ73 is positioned facing the projection lens L of each projector PJ11 to PJ73.

By this means, as each light shielding pattern corresponds to the overlap area occurring between the projectors which are to carry out the projection in each display mode M0 to M3, it is possible to prevent the luminance from increasing in each overlap area.

(Light Shielding Device and Multi-projection System)

Next, a description will be given of the light shielding device of the invention and the multi-projection system using the light shielding device.

The light shielding device of the invention uses the edge blending device. That is, it includes light shielding pattern formation portions in which is formed an opening pattern remaining opened with no light shielding plate 20 attached to the light shielding pattern formation portions in the heretofore described edge blending device, and light shielding pattern formation portions in which is formed a shielding pattern with the light shielding plate capable of the complete shielding attached thereto. Consequently, as a configuration of the light shielding device of the invention has only the light shielding pattern formation portions changed from the configuration of the heretofore described edge blending device, a description of the embodiment regarding the light shielding device will be omitted.

Also, the multi-projection system using the light shielding device, by using the opening pattern and the shielding pattern to cause a plurality of projectors arranged in prescribed positions to act as the projectors which carry out the projection and the projectors which carry out no projection, projects projection screens corresponding to the set display mode onto the screen. Consequently, as a configuration of the multi-projection system using the light shielding device is basically the same as the configuration of the heretofore described multi-projection system, a description of the embodiment regarding the multi-projection system will be omitted.

Figure 17:
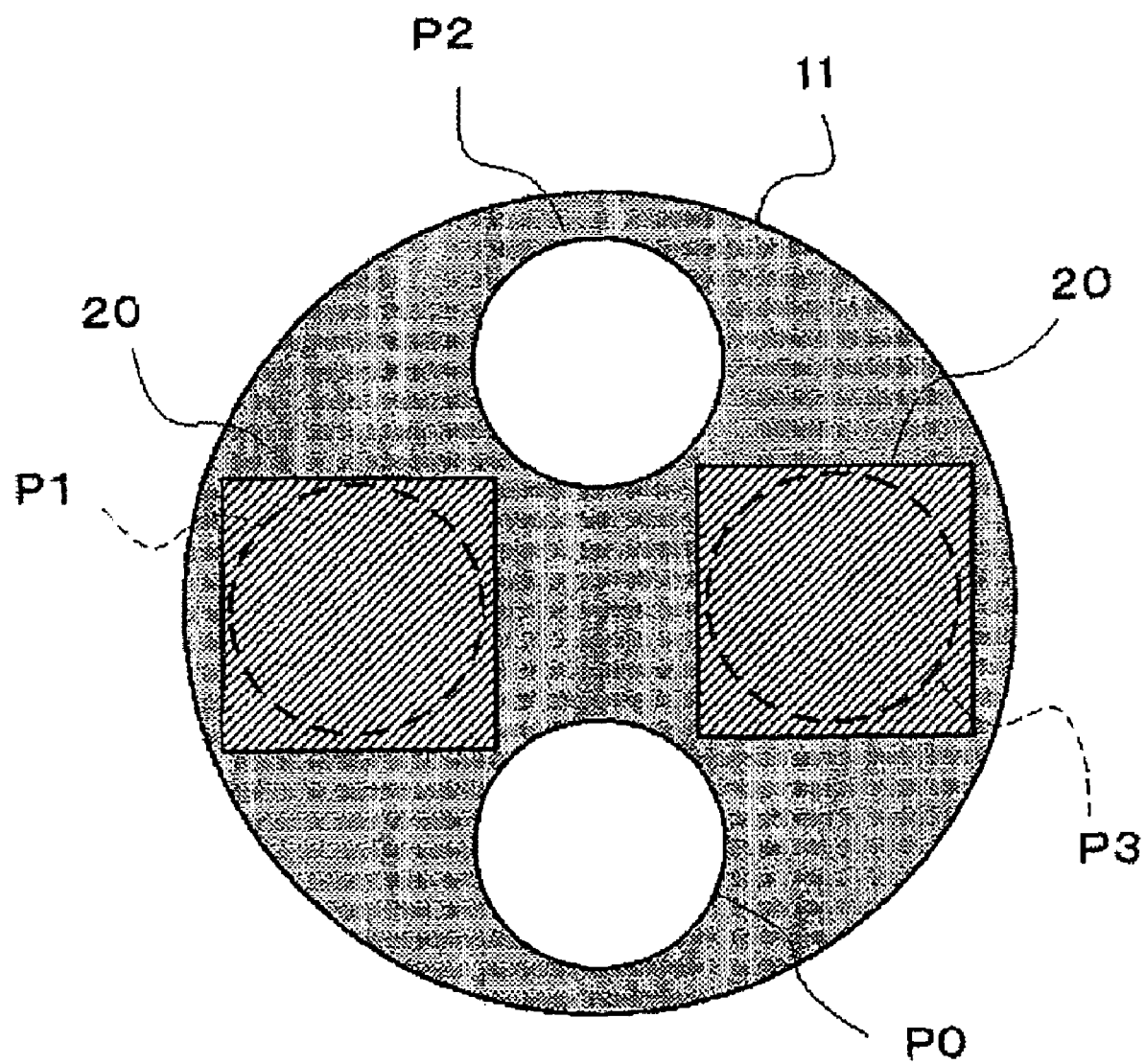
FIG. 17 shows an example of a light shielding unit holder used as a light shielding device.

An example of the light shielding unit holder 11 when using the edge blending device as the light shielding device is shown in FIG. 17. As shown in the figure, in the light shielding unit holder 11, light shielding pattern formation portions P0 to P3 formed of four circular openings are provided at equal intervals (at every angle of 90 degrees). Then, the light shielding plate 20 which can completely shield the projection light from the projector is attached to the light shielding pattern formation portion P1 and the light shielding pattern formation portion P3, forming the shielding pattern. Meanwhile, no light shielding plate is attached to the light shielding pattern formation portion P0 and the light shielding pattern formation portion P2, forming the opening pattern through which the projection light from the projector is transmitted intact. Naturally, it is needless to say that a number and a position of the light shielding pattern formation portions formed in the light shielding unit holder 11 are not particularly limited to this.

The light shielding pattern formation portion P0 or the light shielding pattern formation portion P2 is switched in such a way that it is positioned facing the projection lens of the projector which carries out the projection in the set display mode. Also, the light shielding pattern formation portion P1 or the light shielding pattern formation portion P3 is switched in such a way that it is positioned facing the projection lens of the projector which carries out no projection in the set display mode.

The switching between the light shielding pattern formation portions is carried out, as described heretofore, by the motor 13 (refer to FIG. 1) rotating through every prescribed angle in accordance with the light shielding pattern control signal generated based on the set display mode, and thereby the light shielding unit holder 11 rotating though every 90 degrees. By this means, in a condition in which the lamp is turned on, by transmitting the projection light from the projector through the opening pattern, and shielding it with the shielding pattern, it is possible to use the projector as a projection projector which carries out the projection and a non-projection projector which carries out no projection. Consequently, as it is possible to place the projector into a projection or a non-projection condition without repeating a turning on and off of the lamp, it is possible to prevent the lamp life from being shortened. Also, as the lamp is continuously on, it is possible to obtain a normally used luminance of the projection light at the time of a start of the projection from the projector.

A description will be given, using FIGS. 18A and 18B, of an example of a display of a multi-projection system configured by arranging a plurality of projectors which are used for the projection and the non-projection by this kind of light shielding device.

Figure 18A:
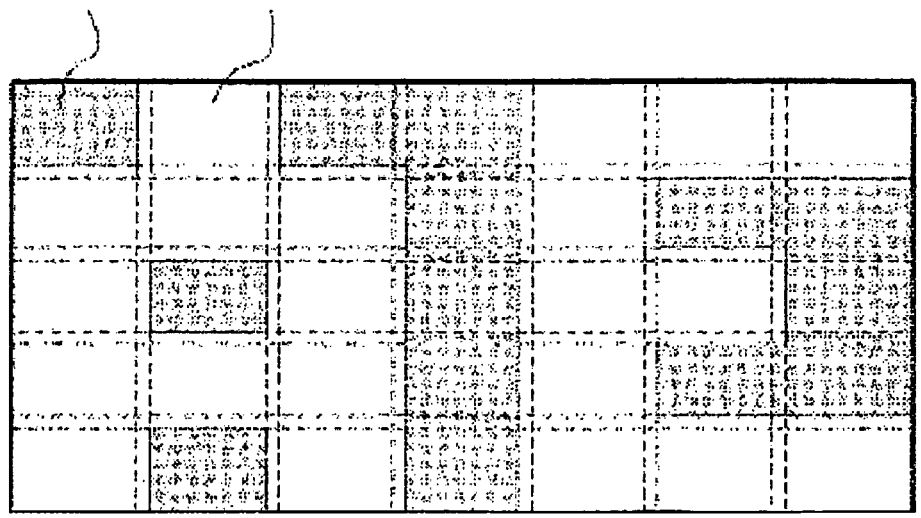
FIGS. 18A and 18B show display examples of a multi-projection system using the light shielding device.
Figure 18B:
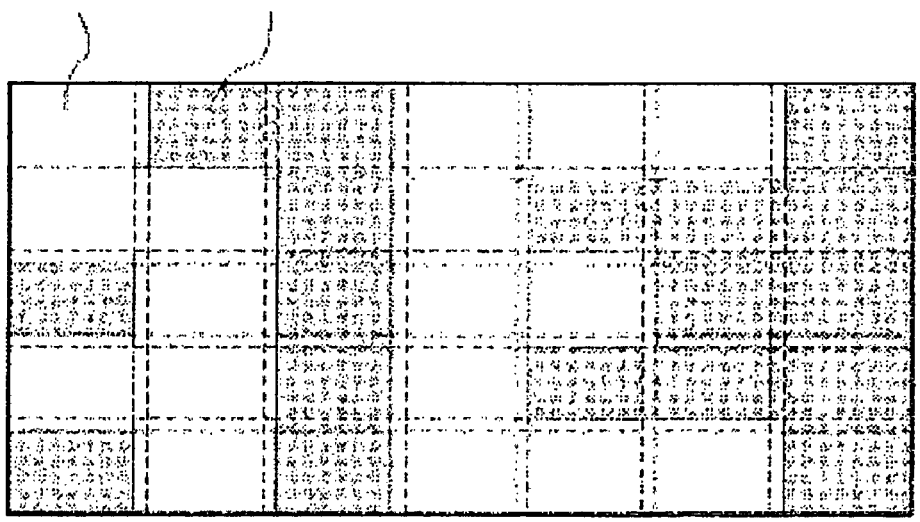

FIGS. 18A and 18B show projection screens of the individual projectors on the screen, providing a multi-projection system configured of (7×5) projectors, seven in the horizontal direction by five in the vertical direction. Then, the set display mode is displayed by combining projectors corresponding to projection screens, among the projection screens corresponding to the individual projectors, shown in outline (referred to as an outline screen) as the projectors which carry out the projection, and projectors corresponding to projection screens shown in shading (referred to as a shaded screen) as the projectors which carry out no projection.

A consideration will be given, as an example of the display by the multi-projection system, of a display in a case in which the multi-projection system is used as a so-called scroll display plate in which, as shown in FIGS. 18A and 18B, letters "A" and "E" of the alphabet are scrolled in a direction from the right to the left of the figures.

It is taken that the letters "A" and "E" of the alphabet, in the currently set display mode, are ones displayed as shown in FIG. 18A. Consequently, in the next display mode, as shown in FIG. 18B, the letters "A" and "E" of the alphabet are displayed scrolled to the left by one projection screen. At this time, as shown in the figure, in a projector (for example, PJ21) corresponding to a projection screen which is switched from the outline screen to the shaded screen, or a projector (for example, PJ11) corresponding to a projection screen which is switched from the shaded screen to the outline screen, as described heretofore, in accordance with the display mode, the light shielding unit holder 11 rotates through 90 degrees, switching the projection screen. A rotation direction not being limited to a fixed direction, it is acceptable that it rotates in both forward and backward directions.

A scroll speed of letters displayed on the projection screen, that is, a switching speed of the display mode depends on a switching time period of the projection screen. Incidentally, as hitherto known, with respect to each of the plurality of projectors, in a case of switching the display mode by turning on and off the lamp, there exists a time period required until the luminance of the lamp turns to a normal luminance after the turning-on and, although omitted from a description, a time period required until the lamp is stably turned on after the turning-off. Consequently, in practice, many problems and difficulty arise in setting the switching time period of the projection screen to a time period shorter than these time periods. In response to this, in the event that a rotation interval of the light shielding unit holder 11 is shortened with the lamp remaining turned on, as it is possible to quickly switch the projector between the projection and non-projection conditions, it is possible to quickly switch the projection screen. As a result, it is possible to increase the scroll speed.

In the projector which carries out no projection, a method can be considered by which the projection screen is turned "black" by turning an image signal level to a "black level", and the display mode is projected in such a way that it appears that no light is projected from the projector. However, in the case of this kind of method, depending on the heretofore described image signal generation device and image signal processing unit, it being necessary, in accordance with the display mode which switches quickly, to generate and distribute the image signal to each projector, a processing load increases, such as a considerable increase in a number of times the image signal is processed. Also, a complete black condition is not obtained due to a "black floating" existing in the projection light. In response to this, in the case of using the light shielding device, as the display mode can be switched simply by rotationally controlling the light shielding unit holder, it is possible to easily carry out the switching of the display mode. Also, as the projection light is completely shielded, it is also possible to completely realize the "black level".

In this way, according to the multi-projection system using the light shielding device, particularly, in the case in which the display mode is quickly changed, it is possible, with the lamp remaining turned on, to use the projectors separately as the projectors which carry out the projection and the projectors which carry out no projection. Consequently, as the lamp serving as the light source of the projector does not need to be turned off regardless of the set display mode, in addition to there being no increase in the number of times the lamp of the projector is turned on, the lamp luminance does not change either, and it is possible to project the light of the same luminance. As a result, it is possible to provide a multi-projection system which, while preventing the lamp life from being shortened, has the luminance difference suppressed in various display modes.

In the case in which the overlap area is formed between adjacent projection lights, it is acceptable to apply the heretofore described edge blending process in accordance with the overlap area. In this case, it is sufficient that the opening pattern is formed in only the light shielding pattern formation portion P0, and the shielding pattern is formed in only the light shielding pattern formation portion P1, and that light shielding plates for the edge blending process are formed in the remaining light shielding pattern formation portions P3 and P4. Originally, in a case of a display mode in which the edge blending process does not need to be applied to the overlap area, and a display mode in which no overlap area exists, it is needless to say that there is no need to apply the heretofore described edge blending process.

Although a description has heretofore been given, using the embodiment, of the edge blending device, light shielding device and multi-projection system of the invention, the invention is not limited to the heretofore described embodiment, and can be variously modified and practiced without departing from the scope of the invention. For example, the invention can also be practiced in kinds of modification example shown in (A) to (K) shown below.

(A) Although, in the heretofore described embodiment, the displayable display modes are the display modes M0 to M3 shown in FIGS. 9A to 9D, without being limited to these, it is needless to say that it is possible to set various display modes.

(B) Although, in the heretofore described embodiment, a description has been given of an example in which the rotational control of the light shielding unit holder 11 corresponding to the switching of the display mode, that is, the light shielding pattern drive control, is automatically carried out in accordance with the light shielding pattern control signal from the control terminal 40, it is acceptable that, by the user manually operating a switch (such as a push button switch) or the like, the light shielding unit holder 11 is rotationally controlled.

(C) Although, in the heretofore described embodiment, a description has been given using an example in which the light shielding unit holder 11 is directly connected to the rotary shaft 13a of the motor 13, it is acceptable that a gear mechanism (not shown) is interposed between the light shielding unit holder 11 and the rotary shaft 13*a* of the motor 13.

(D) Although, in the heretofore described embodiment, one edge blending device is provided with one light shielding unit holder, it is also possible to cause an operation by combining a plurality of light shielding unit holders (not shown). For example, it is acceptable to combine and use a total of two light shielding unit holders: one which can form a light shielding pattern corresponding to overlap areas occurring in left and right side edges of a projection light from one certain projector, and the other which can form a light shielding pattern corresponding to overlap areas occurring in upper and lower side edges of the projection light from the projector.

(E) Although, in the heretofore described embodiment, the rear projection type multi-projection system is used, it is needless to say that it is also applicable to a front projection type multi-projection system, and a number of projectors used is also optional.

Figure 12C:
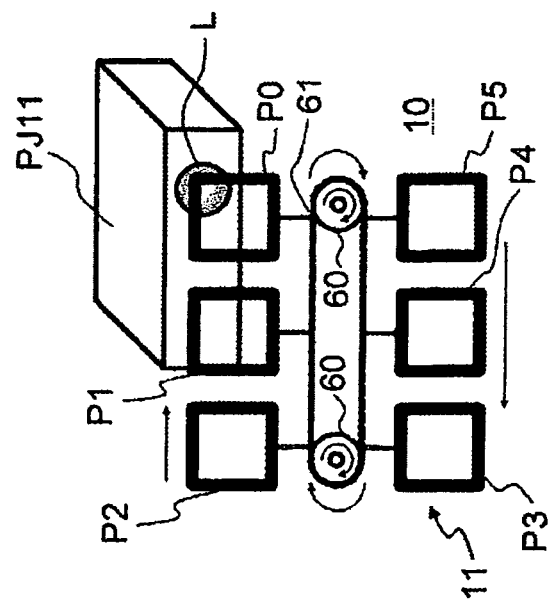
FIGS. 12A to 12C schematically show modification examples of the edge blending device.
Figure 12B:
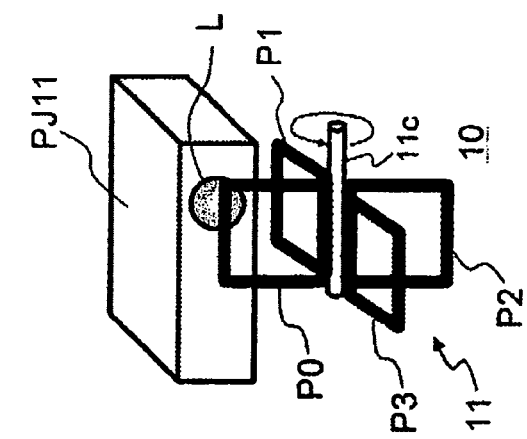
Figure 12A:
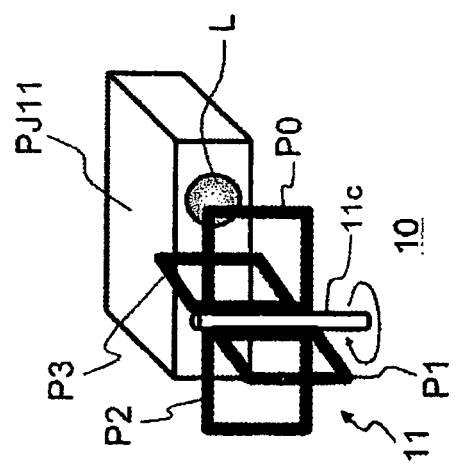

(F) Although, in the heretofore described embodiment, the edge blending device 10 includes the disk-like light shielding unit holder 11, it is acceptable that it includes kinds of light shielding unit holder 11 shown in FIGS. 12A to 12C.

FIGS. 12A to 12C schematically show modification examples of the edge blending device 10. In FIGS. 12A to 12C, the light shielding pattern drive controller 12 (the motor 13, the motor controller 14), the initial position detection sensor 15, the component part attachment table 16 and the like are omitted from the illustration.

In the light shielding unit holders 11 shown in FIGS. 12A and 12B, in these examples, four light shielding pattern formation portions P0 to P3 are attached to the rotary shaft 11*c* at an angle of 90 degrees to each other. In the examples of FIGS. 12A to 12C, the light shielding pattern formation portions P0 to P3 are each configured of a quadrangular frame body and an opening surrounded by the frame body and, by the rotary shaft 11*c* being rotated through every prescribed angle (in these examples, 90 degrees) by means of the motor 13 (not shown in FIGS. 12A to 12C), the opening surrounded by each frame body is positioned facing the projection lens L of a projector (the projector PJ11).

Then, by attaching kinds of light shielding plate 20 shown in FIGS. 3A to 3D to each light shielding pattern formation portion P0 to P3, it is possible to form kinds of light shielding pattern described in FIGS. 10A to 10D or FIGS. 11A to 11F. It should be noted that both lengthwise side edges of each light shielding plate 20 are attachable to the frame by means of some kind of attachment units proposed as an example in the heretofore described embodiment.

In the examples of FIGS. 12A and 12B, as the four light shielding pattern formation portions P0 to P3 are provided on the rotary shaft 11*c*, it is possible to form light shielding patterns corresponding to the four kinds of display mode. It is also possible to provide five light shielding pattern formation portions or more.

Also, in FIG. 12C, a plurality (six) of light shielding pattern formation portions P0 to P5 are attached to a belt 61 which is moved by means of pulleys 60 or the like. Then, by the movement of the belt 61, it is possible to cause openings of the individual light shielding pattern formation portions P0 to P5 to sequentially face the projection lens L of the projector PJ11.

Figure 13:
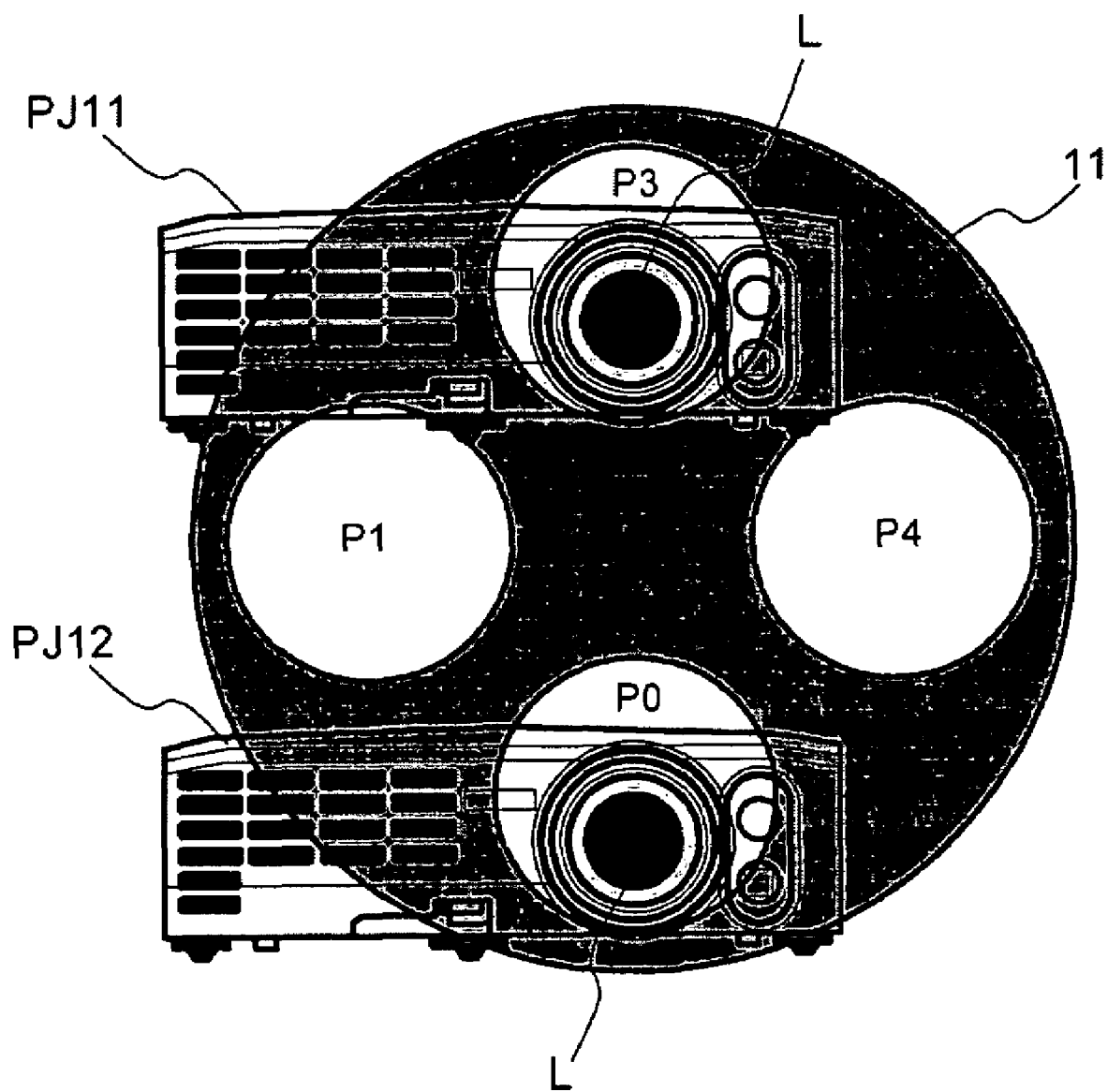
FIG. 13 shows an example in which the light shielding unit holder of one edge blending device is used in the plurality of projectors.

(G) Although, in the heretofore described embodiment, an example has been shown in which one edge blending device 10 is provided corresponding to one projector, as shown in FIG. 13, it is also possible to use the light shielding unit holder 11 of one edge blending device 10 for a plurality of projectors (in the example of FIG. 13, two projectors PJ11 and PJ12 disposed above and below).

In the example of FIG. 13, the light shielding unit holder 11 of one edge blending device 10 is provided with four light shielding pattern formation portions P0, P1, P3 and P4 and, among the four light shielding pattern formation portions P0, P1, P3 and P4, the light shielding pattern formation portions P0 and P3 and the light shielding pattern formation portions P1 and P4 simultaneously face the respective projection lenses L of two projectors PJ11 and PJ12 that are arranged up and down.

(H) Also, it is possible to convert a whole of the light shielding unit holder 11 into a planetary gear mechanism. That is, in the event of having a structure in which a sun gear is connected to the rotary shaft 13*a* of the motor 13, and the light shielding pattern formation portions P0 to P4 are replaced with planet gears, it is possible to realize the invention.

(I) Although, in the heretofore described embodiment, the light shielding pattern formation portions P0 to P4 of the light shielding unit holder 11 are positioned facing the projection lens L of the projector, for example, in a case of using a lens shift mechanism, a surface reflecting mirror and the like, the light shielding pattern formation portions P0 to P4 do not necessarily need to be positioned facing the projection lens L of the projector.

Figure 14A:
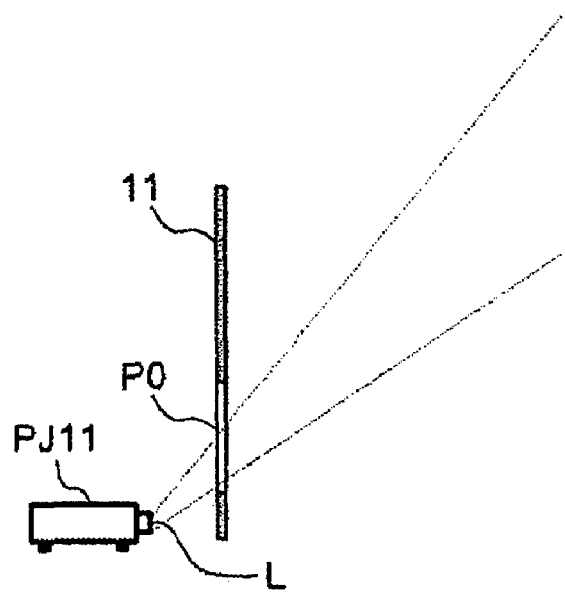
FIGS. 14A and 14B show examples in which the light shielding pattern formation portions P0 to P4 do not need to be positioned facing a projection lens of the F projector.
Figure 14B:
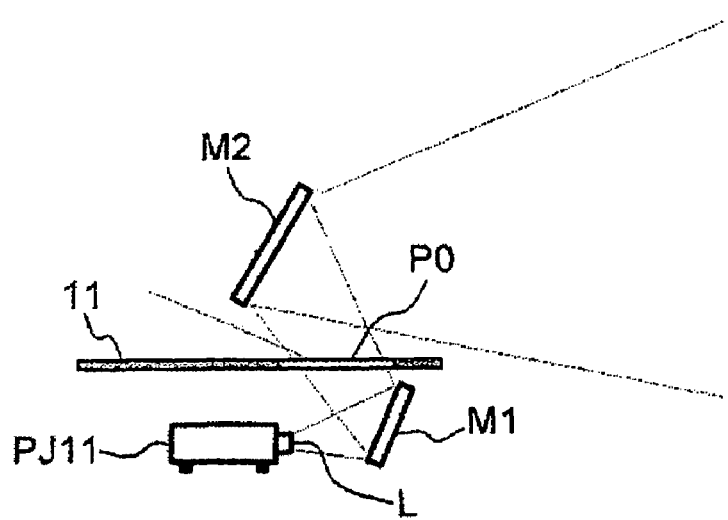
Figure 15A:
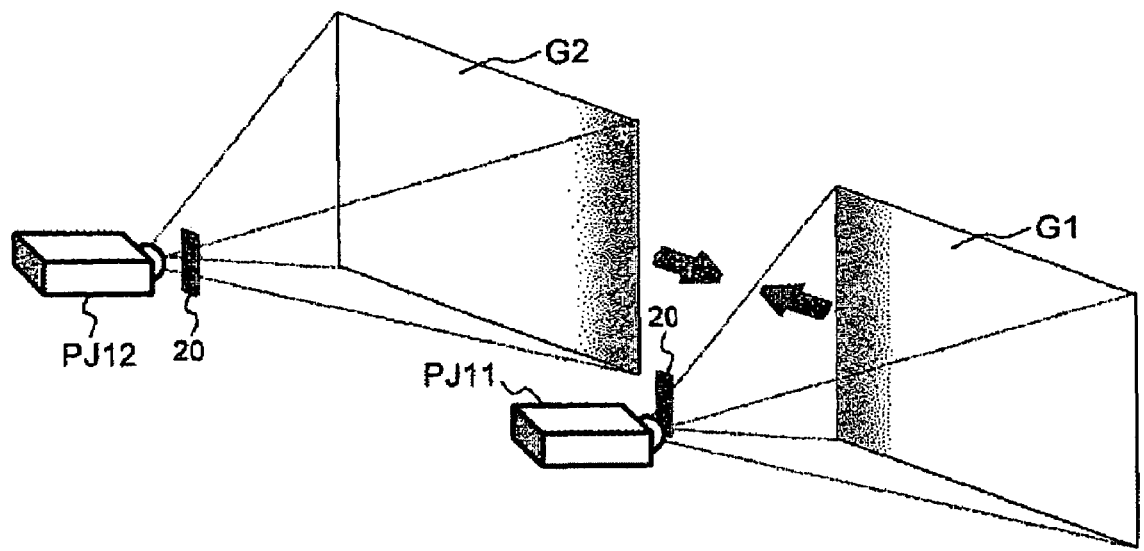
FIGS. 15A and 15B schematically illustrate an example in which the light shielding plates are used as an optical type edge blending technology.
Figure 15B:
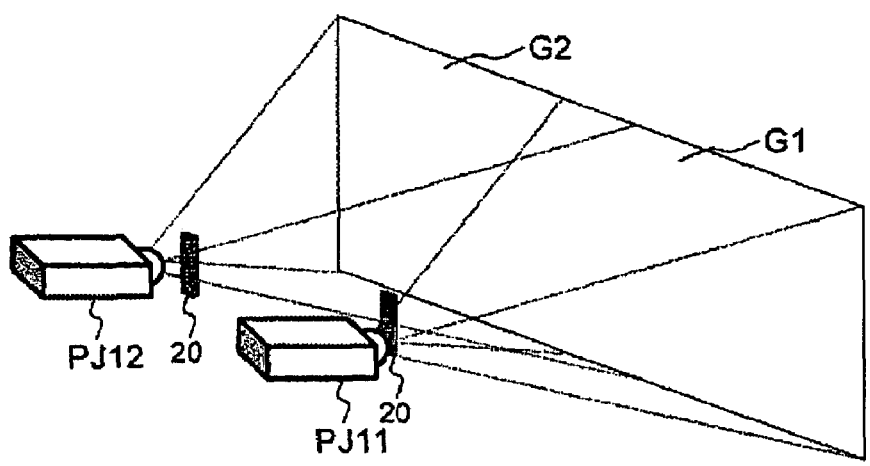
Figure 16A:
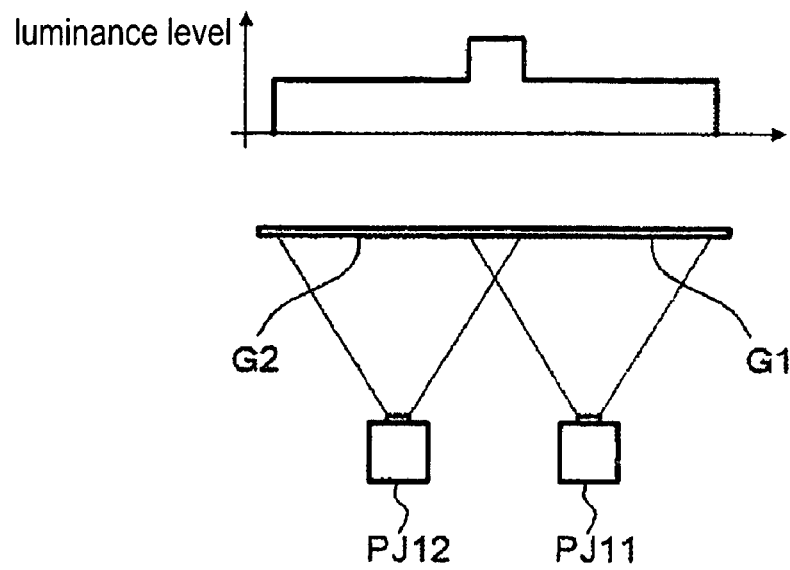
FIGS. 16A and 16B show respectively a luminance level in an overlap area in a case of providing no light shielding plate and a luminance level in the overlap area in a case of providing the light shielding plates.
Figure 16B:
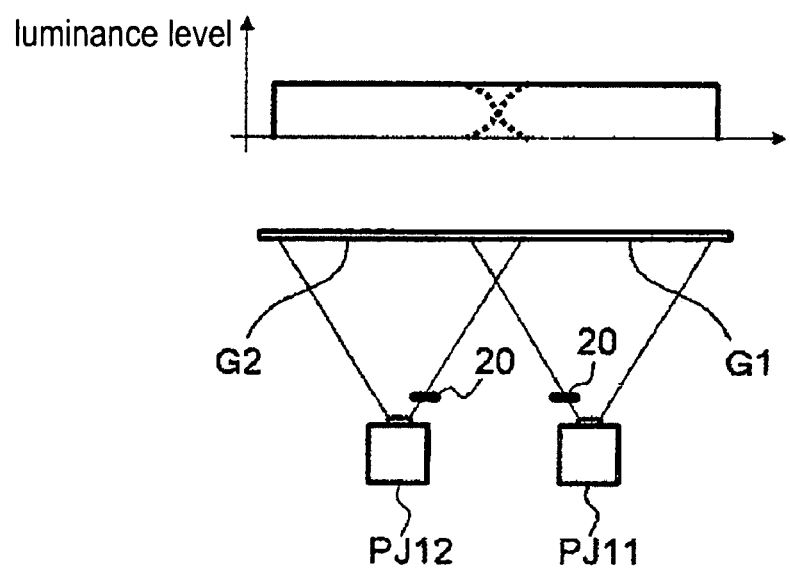

FIGS. 14A and 14B show an example in which the light shielding pattern formation portions P0 to P4 do not need to be positioned facing the projection lens L of the projector. FIG. 14A shows a case in which, using the lens shift mechanism, a projection light from a projector (the projector PJ11) is shifted obliquely upward and projected onto a not-shown screen, and FIG. 14B shows a case in which, using two surface reflecting mirrors M1 and M2, the projection light from the projector PJ11 is reflected by the two surface reflecting mirrors M1 and M2 and projected onto the not-shown screen. In both these cases, a light shielding pattern formation portion (the light shielding pattern formation portion P0) of the light shielding unit holder 11 does not need to be positioned facing the projection lens L of the projector PJ11 and, as shown in FIGS. 14A and 14B, it is sufficient that the light shielding pattern formation portion P0 is positioned in such a way as to correspond to the projection light from the projector PJ11.

(J) Although, in the heretofore described embodiment, a formation of a desired light shielding pattern is carried out by attaching the detachable light shielding plate 20 to the light shielding pattern formation portions P0 to P4, in a multi-projection system in which, a plurality of displayable display modes being fixed, it is not necessary to change a light shielding pattern to be formed in each light shielding pattern formation portion P0 to P4 of the edge blending device 10 with respect to each projector, as it is possible to fix the light shielding pattern to be formed in each light shielding pattern formation portion P0 to P4 of the edge blending device 10, it is not necessary to prepare separate light shielding plates 20, and it is also possible to form the light shielding pattern formation portions P0 to P4 themselves into a shape in which a prescribed light shielding pattern can be obtained.

(K) Although, in the heretofore described embodiment, a description has been given of a case in which the projector is used as the projection unit, it is needless to say that the invention is not particularly limited to this. Any projection unit which includes a light source and projects a light having a prescribed screen area, such as, for example, a slide projector, a spot light or a search light, is acceptable.

The entire disclosure of Japanese Patent Application Nos. 2005-345302, filed Nov. 30, 2005 and 2006-297446, filed Nov. 1, 2006 are expressly incorporated by reference herein.

The invention claimed is:

1. An edge blending device which suppresses an increase in a luminance of a projection screen in an overlap area in which projection lights projected from a plurality of projection units onto a screen overlap each other, characterized by comprising:
- a light shielding means holder which includes light shielding pattern formation portions which can form a light shielding pattern corresponding to the projection lights forming the overlap area;
- a light shielding pattern drive controller which controls a drive of the light shielding means holder in such a way that the light shielding pattern formation portions are positioned corresponding to the projection lights from the projection units; and
- initial position detection means for detecting an initial position of the light shielding means holder, wherein the light shielding pattern drive controller, with the initial position detected by the initial position detection means as a reference, controls the drive of the light shielding means holder.

2. The edge blending device according to claim 1, characterized in that the light shielding means holder is equipped with a board-shaped member including at least one opening formed in a board surface as a light shielding pattern formation portion, and the board-shaped member is configured in such a way as to be movable by means of the light shielding pattern drive controller.

3. The edge blending device according to claim 2, characterized in that the light shielding means holder, being formed of a disk-shaped member having one rotation center, is provided with the light shielding pattern formation portions by forming a plurality of openings, which can transmit the projection lights from the projection units, at an equal distance from the rotation center and at prescribed intervals.

4. The edge blending device according to claim 1, characterized in that the light shielding pattern is formed by attaching a light shielding plate to the light shielding pattern formation portions.

5. A multi-projection system, characterized by comprising:
- a plurality of projection units; and an edge blending device which suppresses an increase in a luminance of a projection screen in an overlap area in which projection lights projected from the projection units onto a screen overlap each other, wherein the edge blending device includes:
- a light shielding means holder which includes light shielding pattern formation portions which can form a light shielding pattern corresponding to the projection lights forming the overlap area;
- a light shielding pattern drive controller which controls a drive of the light shielding means holder in such a way that the light shielding pattern formation portions are positioned corresponding to the projection lights from the projection units; and
- initial position detection means for detecting an initial position of the light shielding means holder, wherein the light shielding pattern drive controller, with the initial position detected by the initial position detection means as a reference, controls the drive of the light shielding means holder.

6. The multi-projection system according to claim 5, characterized in that the edge blending device is provided corresponding to each of the plurality of projection units.

7. The multi-projection system according to claim 5, characterized in that the edge blending device, based on a display mode showing a combination of projectors, among the plurality of projectors, which are to carry out a projection, controls the drive of the light shielding means holder.

8. The multi-projection system according to claim 7, characterized in that the light shielding pattern formed in the light shielding pattern formation portions is a light shielding pattern corresponding to the overlap area in which the projection lights overlap each other in the display mode.

9. The multi-projection system according to claim 7, characterized by further comprising: a control terminal which enables a control of the edge blending device, wherein the control terminal, when a setting of the display mode is carried out, transmits a control signal instructing the setting of the display mode to the edge blending device.

10. The multi-projection system according to claim 9, characterized in that the light shielding pattern drive controller of the edge blending device, based on the control signal, drives the light shielding means holder in such a way that a light shielding pattern formation portion having the light shielding pattern corresponding to the overlap area formed in the display mode is positioned corresponding to a projection light from a projection unit corresponding to the edge blending device.

11. The multi-projection system according to claim 9, characterized in that the control terminal and the edge blending device are connected by a network.

12. The multi-projection system according to claim 9, characterized in that the light shielding means holder includes, in the light shielding pattern formation portions, a light shielding pattern formation portion having formed therein a light shielding pattern which completely shields the projection light from the projection unit, and in that
- the light shielding pattern drive controller drives the light shielding means holder in such a way that, with respect to a projection unit which carries out no projection in accordance with the display mode, the light shielding pattern formation portion having formed therein the light shielding pattern which completely shields the projection light is positioned corresponding to the projection light from the projection unit.

13. A light shielding device which shields a projection light projected from a projection unit onto a screen, characterized by comprising:
- a light shielding means holder which includes a plurality of light shielding pattern formation portions having formed therein two kinds of light shielding pattern, an opening pattern which can transmit the projection light from the projection unit, and a shielding pattern which can shield the projection light from the projection unit; and
- a light shielding pattern drive controller which controls a drive of the light shielding means holder in order to cause one of the two kinds of light shielding pattern formation portion to correspond to the projection light from the projection unit.

14. The light shielding device according to claim 13, characterized in that
- the light shielding means holder further includes a light shielding pattern formation portion in which a light shielding pattern corresponding to an overlap area in which projection lights projected from a plurality of projection units onto the screen overlap each other is formed as the opening pattern, wherein
- the light shielding pattern drive controller controls the drive of the light shielding means holder in such a way that light shielding pattern formation portions corresponding to the overlap area are positioned corresponding to the projection lights from the projection units which form the overlap area.

* * * * *